(12) United States Patent
Chapman

(10) Patent No.: US 6,517,207 B2
(45) Date of Patent: Feb. 11, 2003

(54) CAMERA CRANE

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 09/864,782

(22) Filed: May 24, 2001

(65) Prior Publication Data

US 2002/0001471 A1 Jan. 3, 2002

Related U.S. Application Data

(63) Continuation-in-part of application No. 09/840,625, filed on Apr. 23, 2001, which is a continuation-in-part of application No. 09/616,587, filed on Jul. 14, 2000, which is a continuation-in-part of application No. 09/584,561, filed on May 31, 2000, now abandoned.

(51) Int. Cl.[7] .............................................. G03B 17/00
(52) U.S. Cl. ..................... 352/243; 396/428; 248/187.1
(58) Field of Search ........................... 396/56, 58, 419, 396/428; 352/243; 248/123.1, 123.2, 187.1; 280/47.11; 348/373

(56) References Cited

U.S. PATENT DOCUMENTS

| | | | | |
|---|---|---|---|---|
| 4,655,567 A | * | 4/1987 | Morley ...................... 352/243 |
| 4,907,768 A | * | 3/1990 | Masseron et al. ......... 248/123.1 |
| 4,943,019 A | * | 7/1990 | Mester ..................... 248/123.1 |
| 5,054,725 A | * | 10/1991 | Bucefari et al. ............ 352/243 |
| 5,463,432 A | * | 10/1995 | Kahn ......................... 352/243 |
| 5,644,377 A | * | 7/1997 | Romanoff et al. .......... 352/243 |
| 5,652,849 A | * | 7/1997 | Conway et al. ............. 396/428 |
| 5,671,932 A | * | 9/1997 | Chapman ................. 280/47.11 |
| 5,856,862 A | * | 1/1999 | Kokush ..................... 352/243 |
| 5,900,925 A | * | 5/1999 | Navarno ..................... 352/243 |
| 6,149,112 A | * | 11/2000 | Thieltges ................. 248/178.1 |

FOREIGN PATENT DOCUMENTS

| | | | |
|---|---|---|---|
| DE | 3334428 A1 | * | 4/1985 |
| DE | 3628782 A1 | * | 3/1986 |
| JP | 64-49483 | * | 2/1989 |

* cited by examiner

Primary Examiner—Alan A. Mathews
(74) Attorney, Agent, or Firm—Perkins Coie LLP

(57) ABSTRACT

A camera crane has a boom arm pivotably connected to a post assembly. A track section is pivotally attached to the front end of the boom arm, and is leveled via leveling rods. A camera frame carrying a camera is linearly moveable along the track section. Pivot joints provide for adjustable drag on pivoting movement, without backlash or slip/stick movement. A remote control accessory is attached to the crane to provide remote movement of the camera platform using joystick controllers.

24 Claims, 31 Drawing Sheets

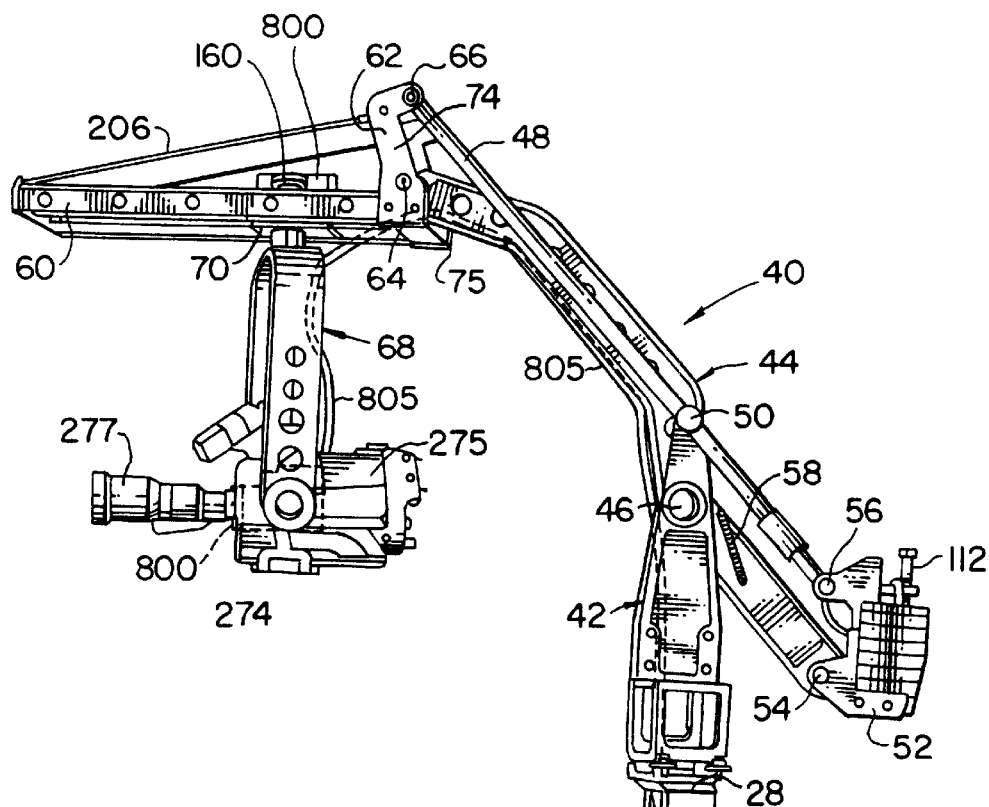
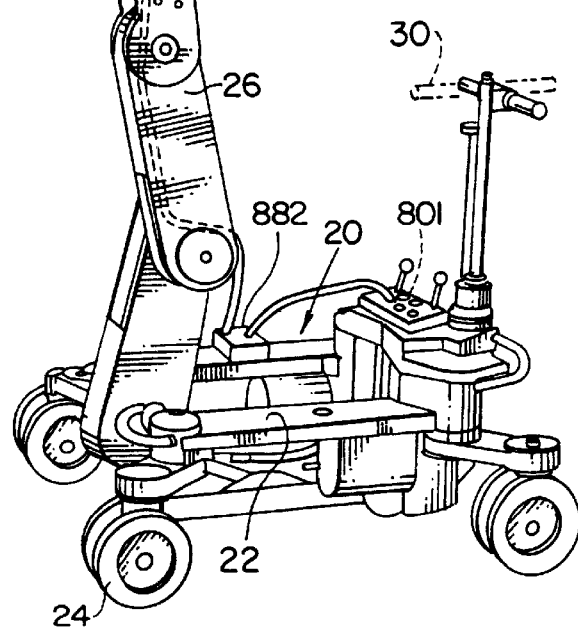
Fig. 1

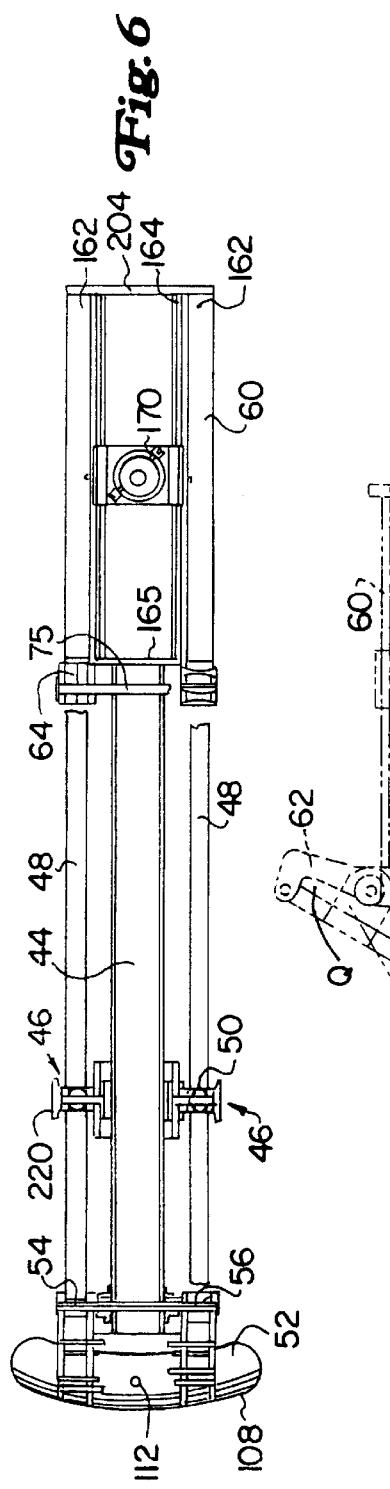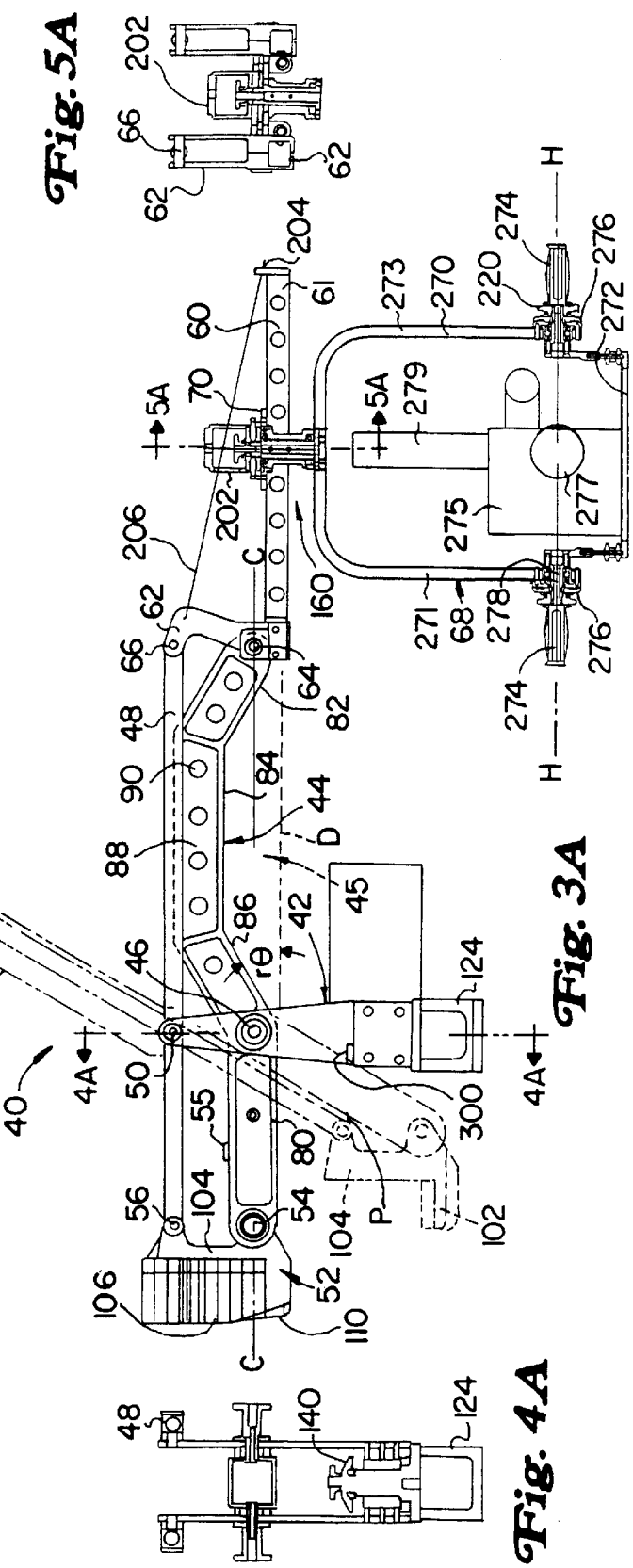

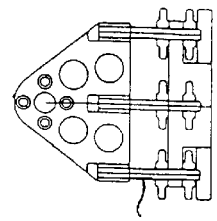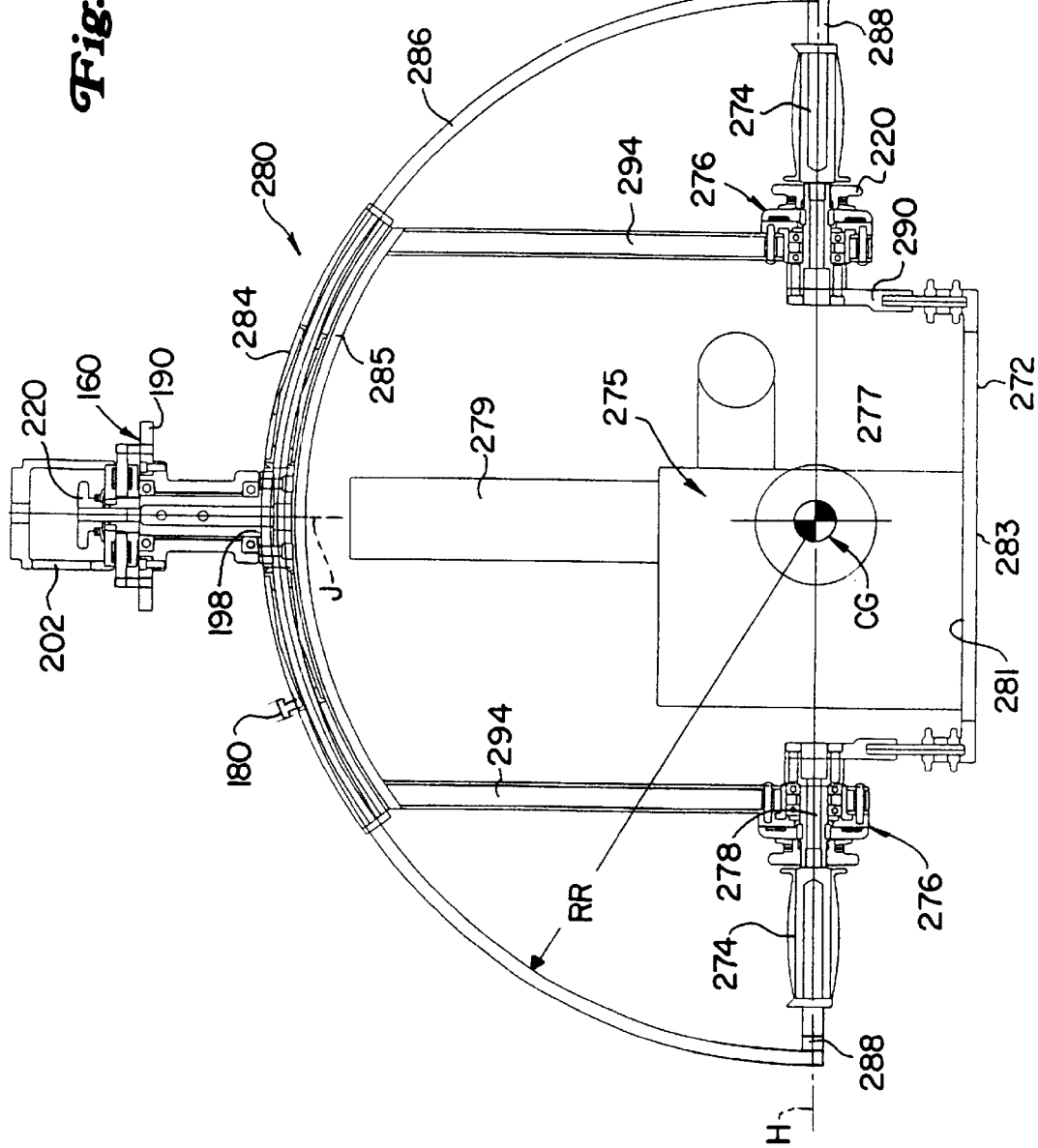

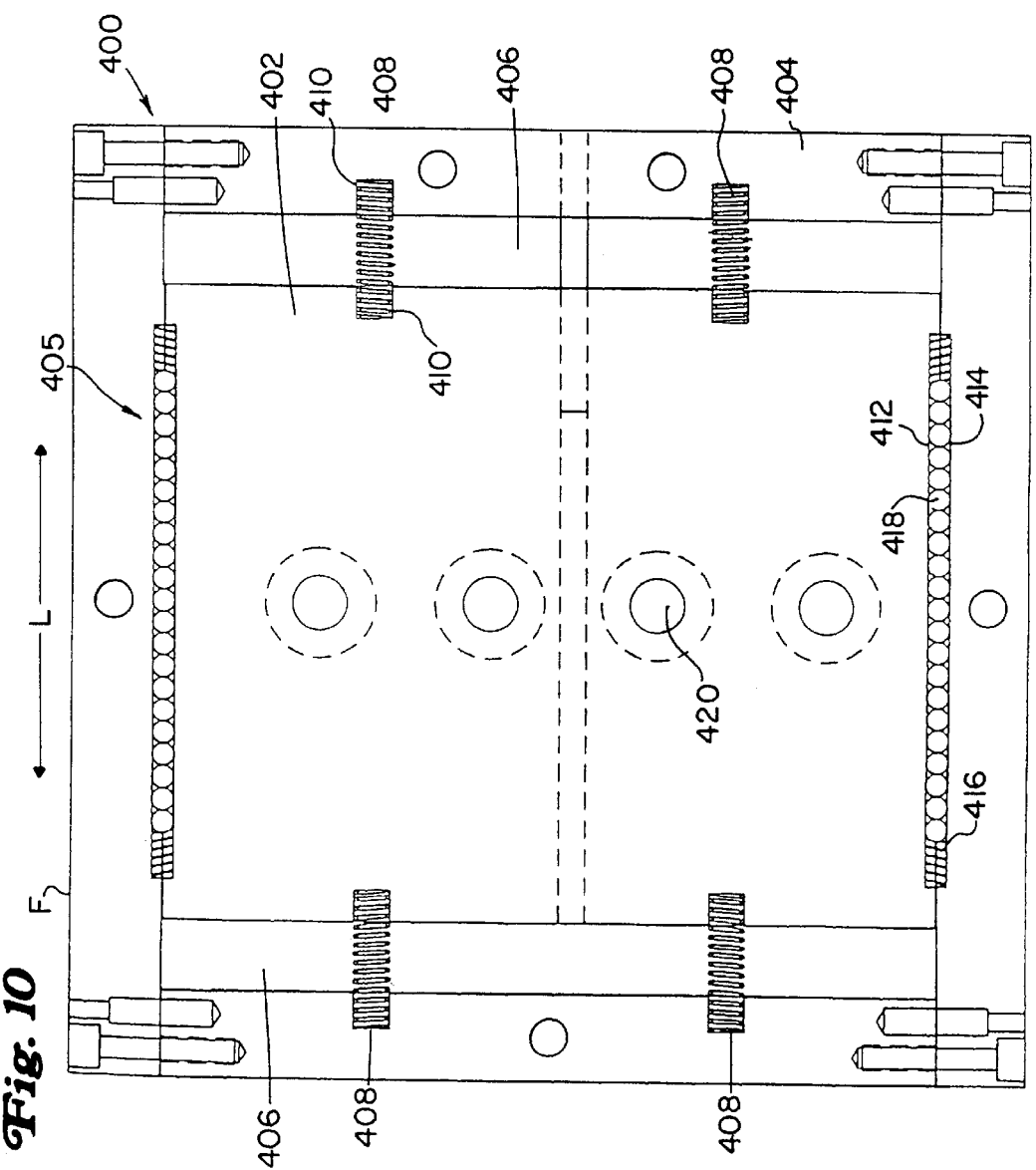

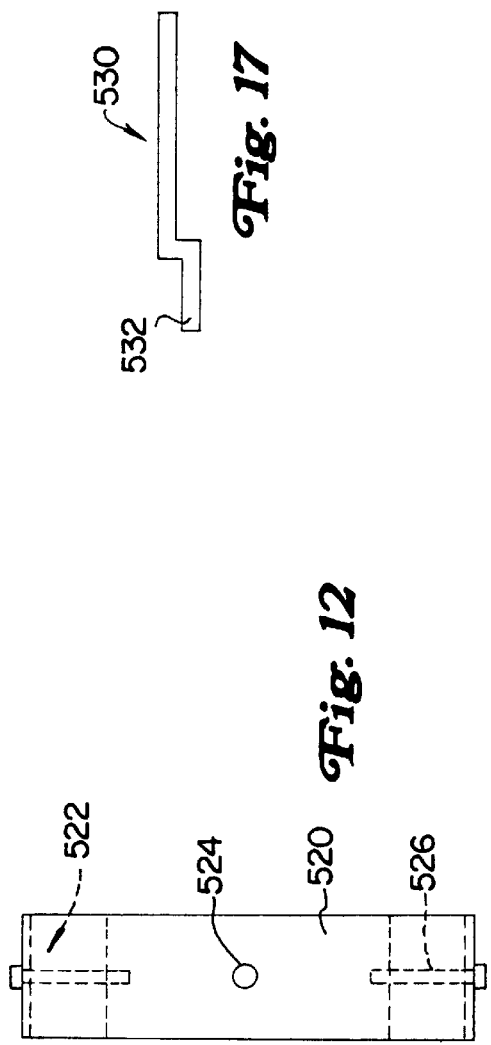
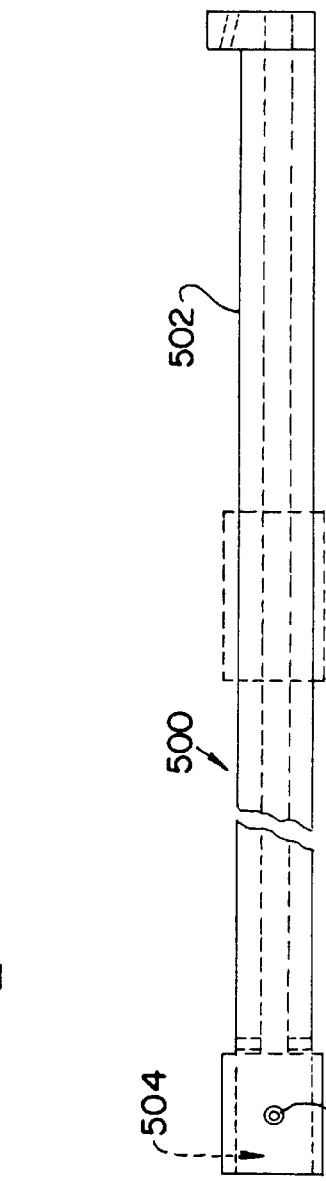
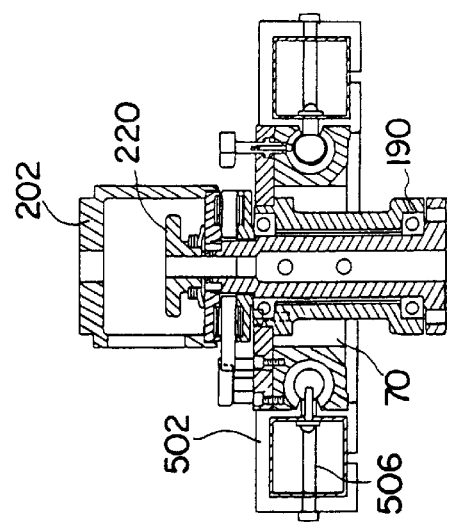

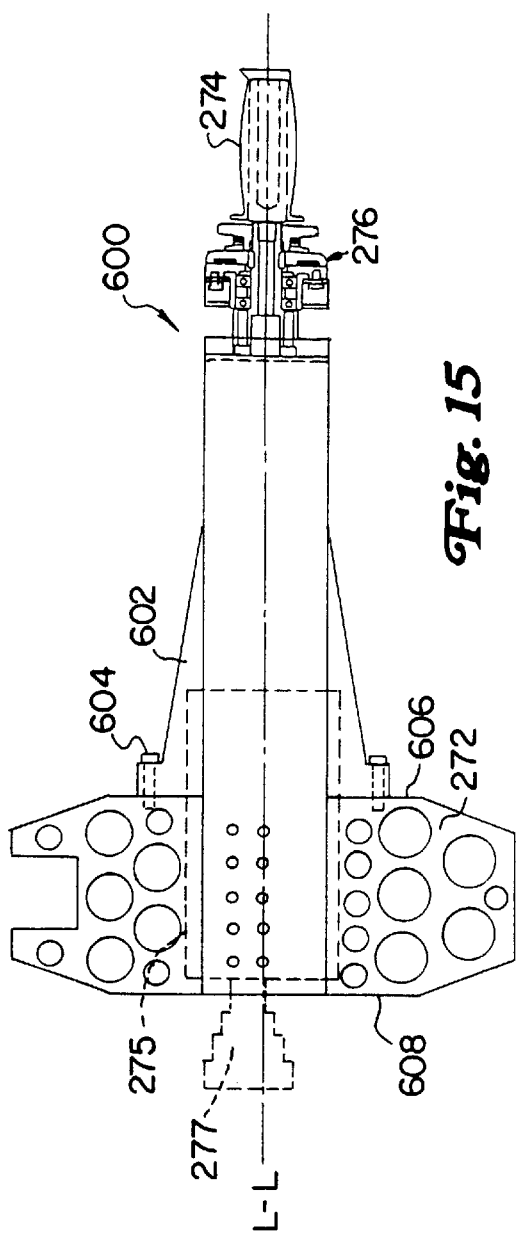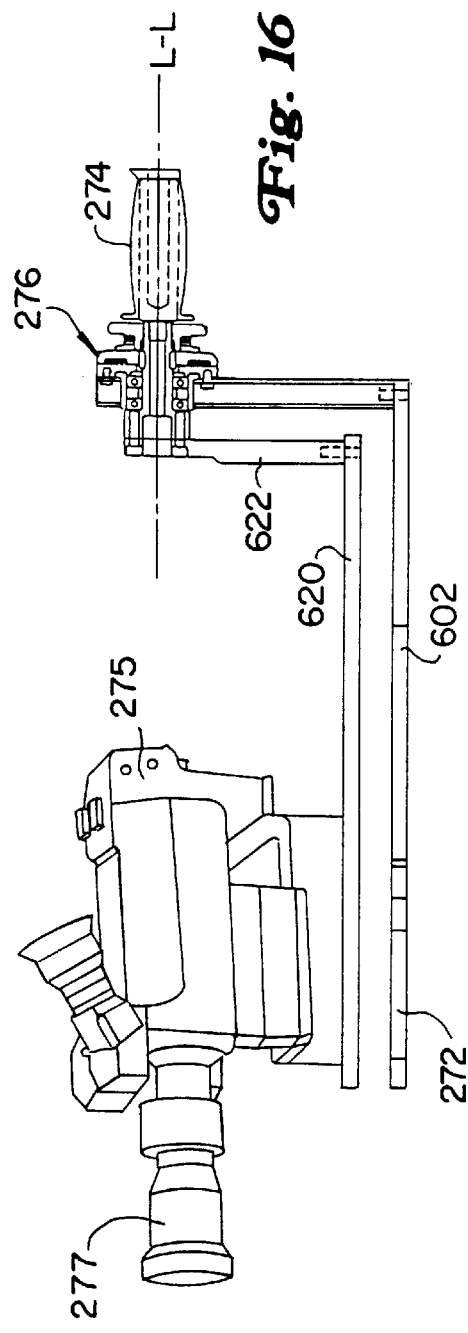

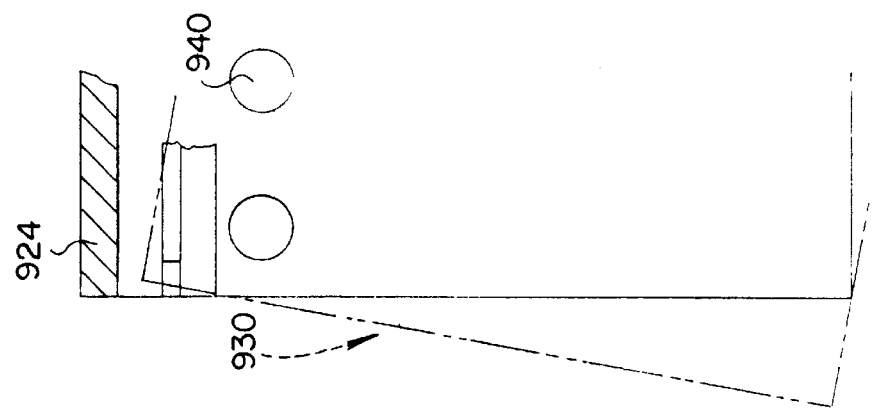
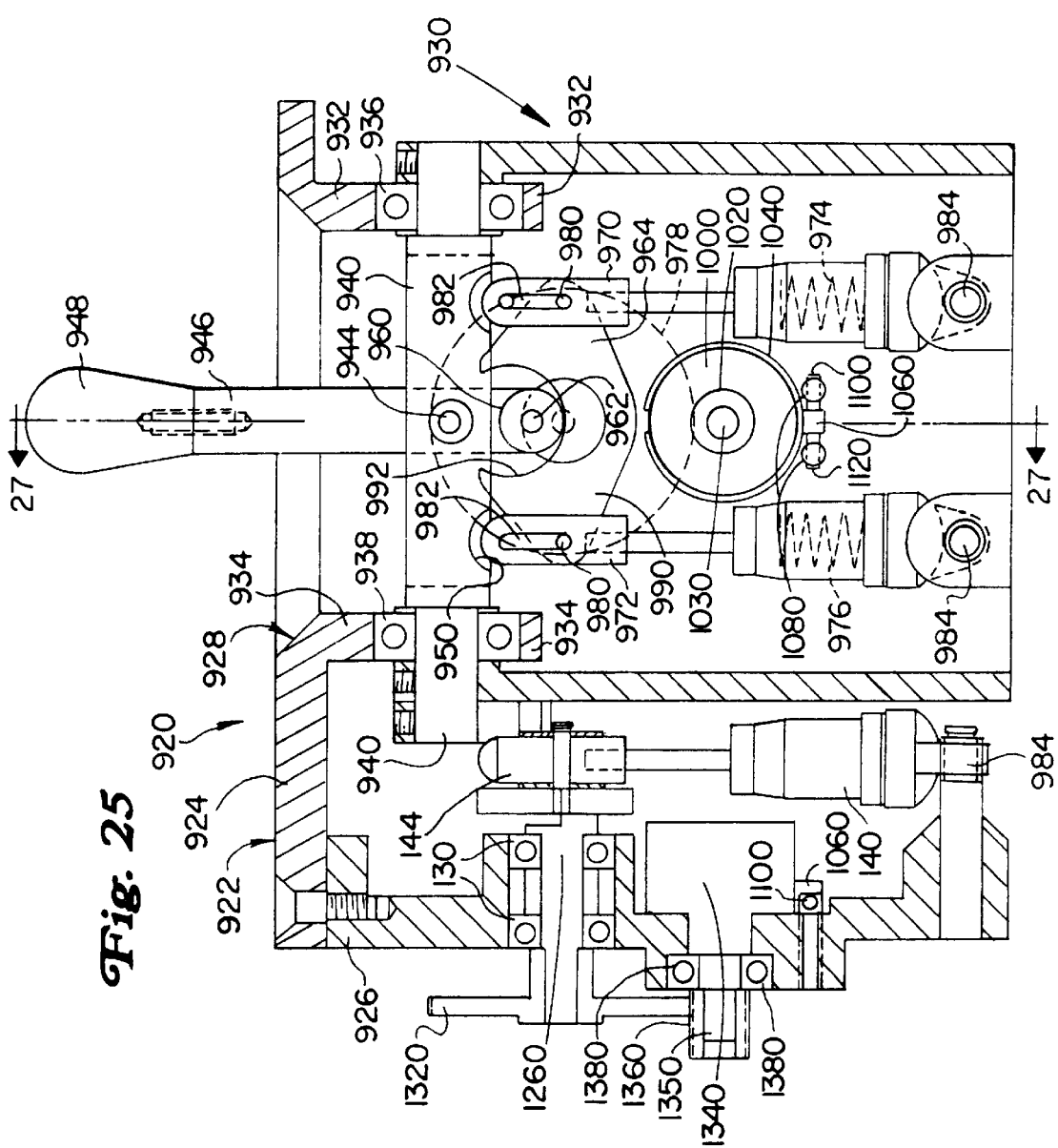

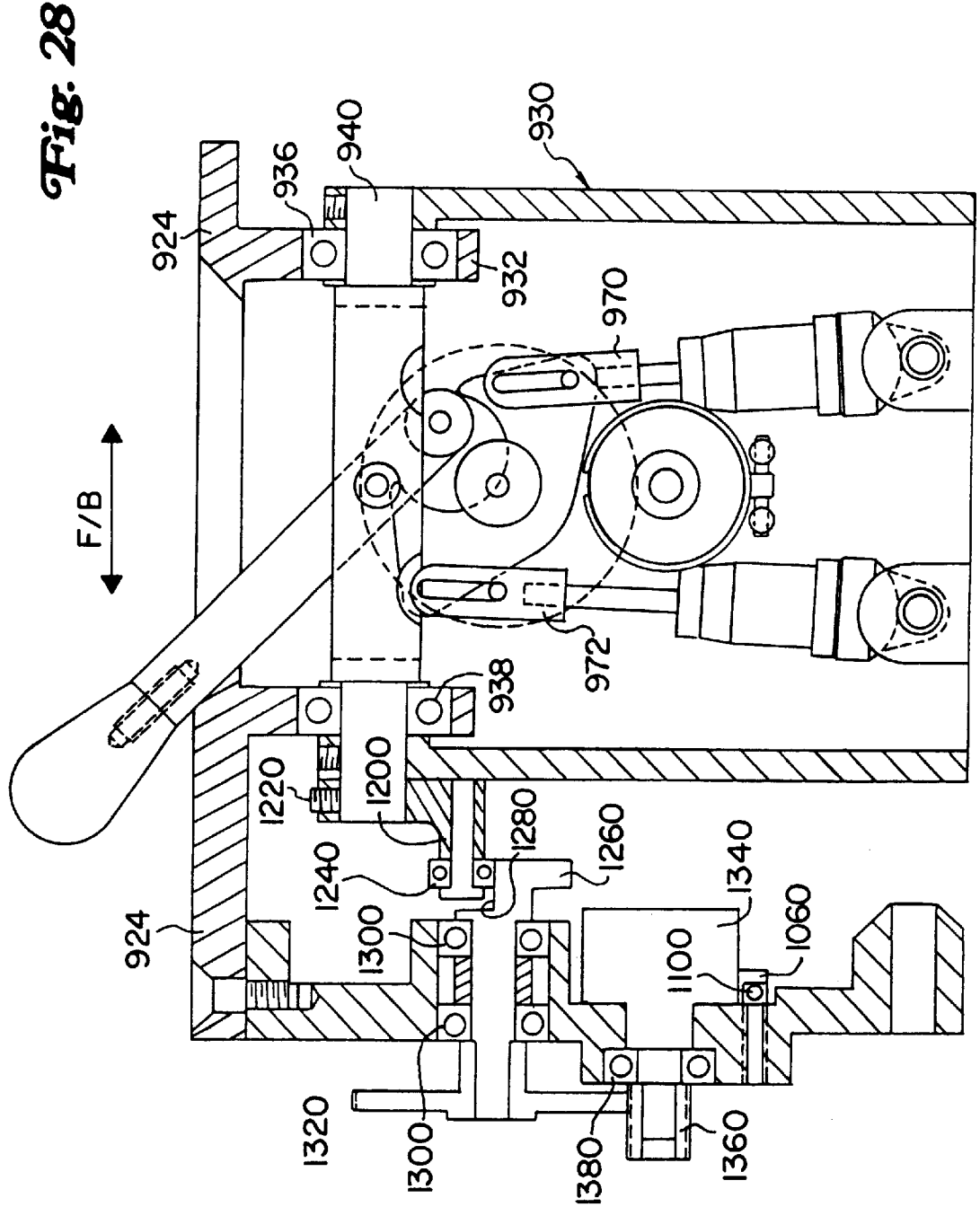

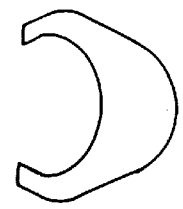 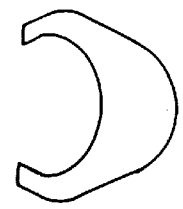 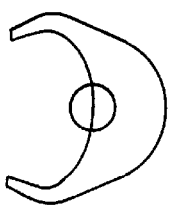 
Fig. 31A  Fig. 31B  Fig. 31C  Fig. 31D
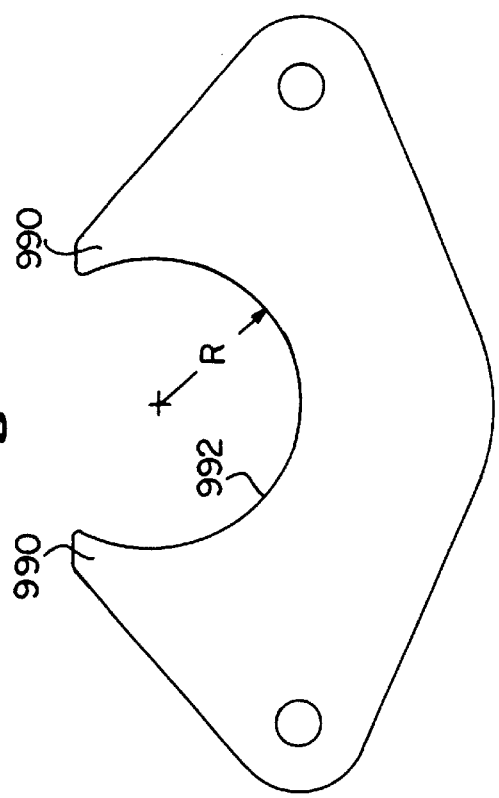
Fig. 30
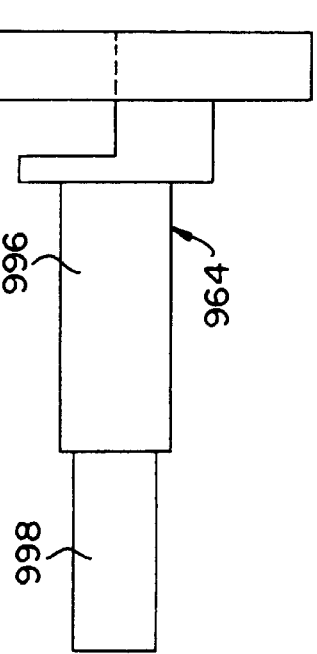
Fig. 29

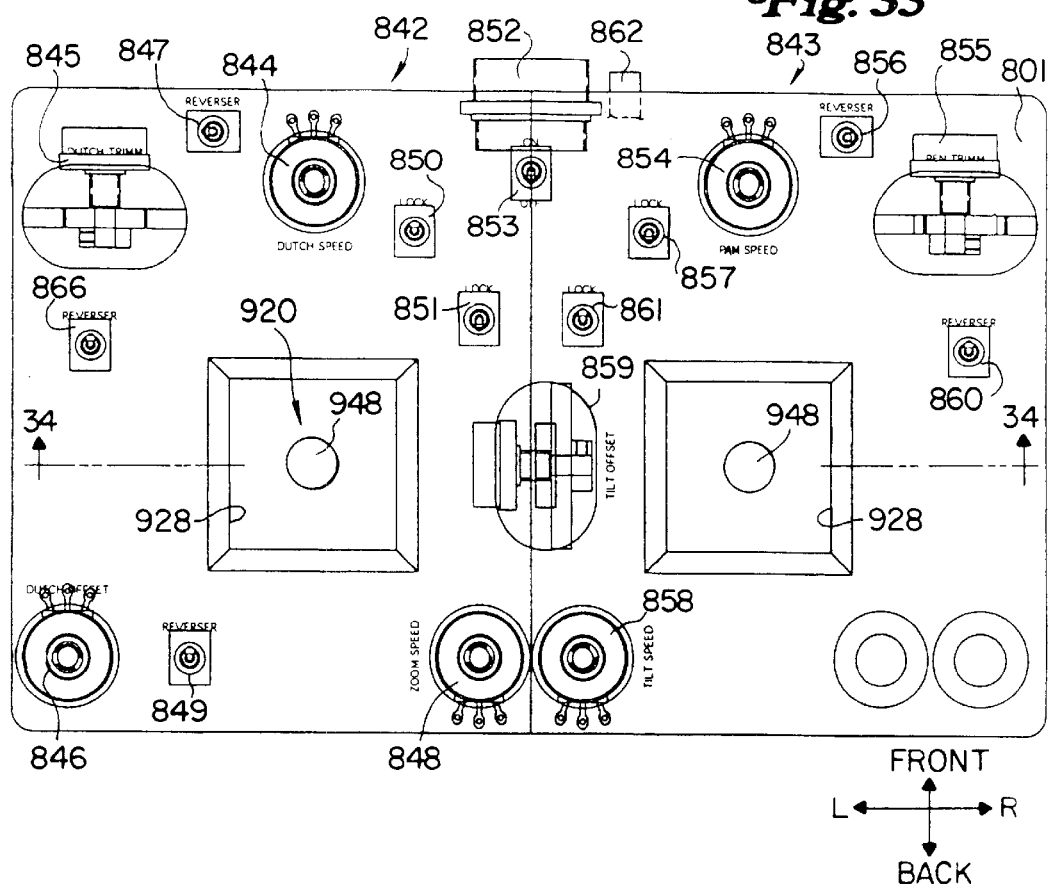
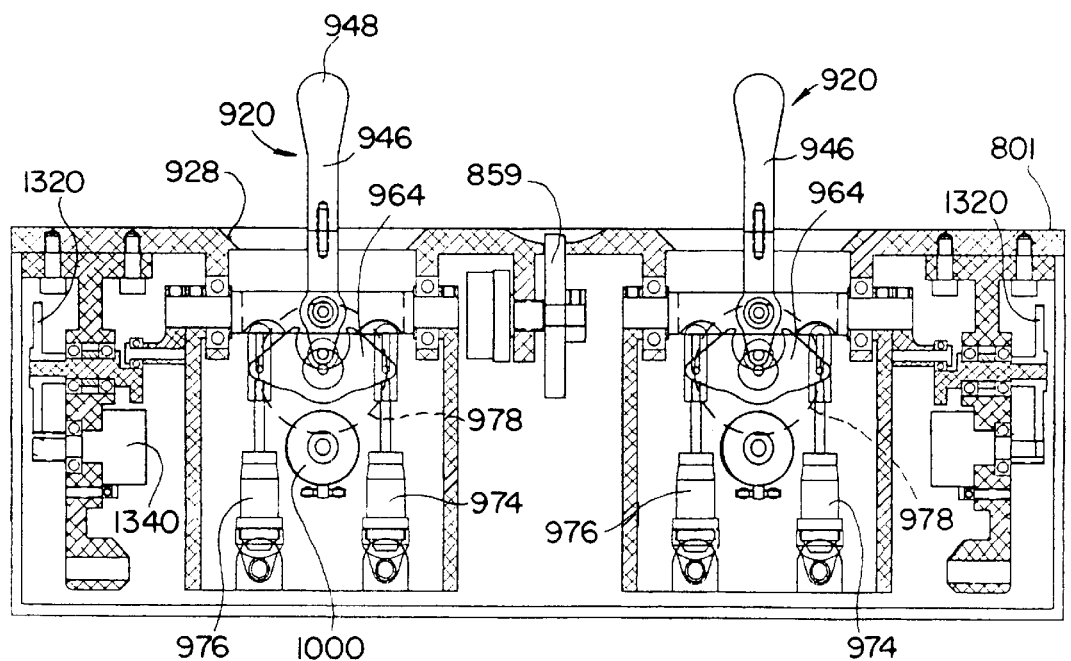

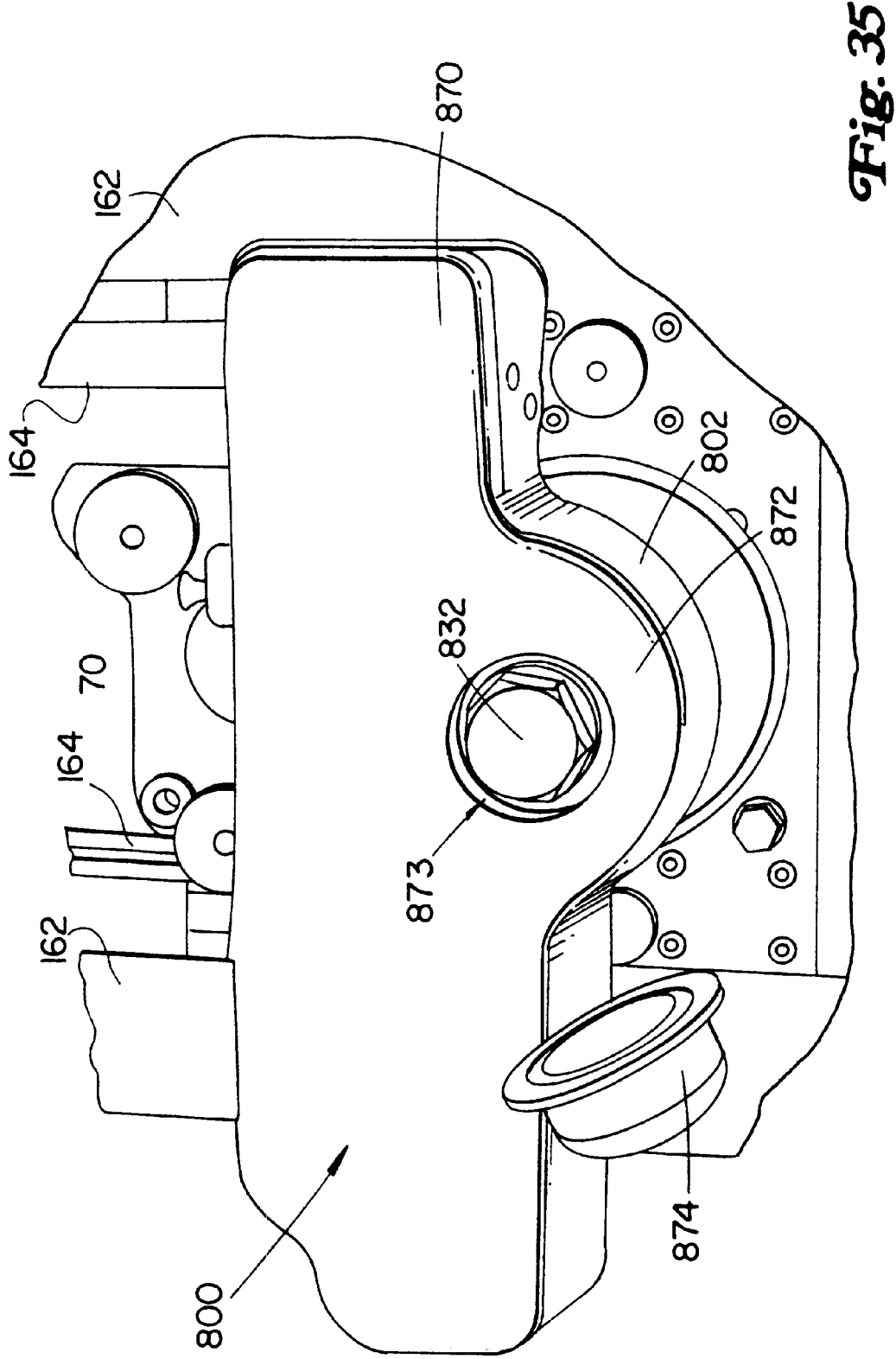

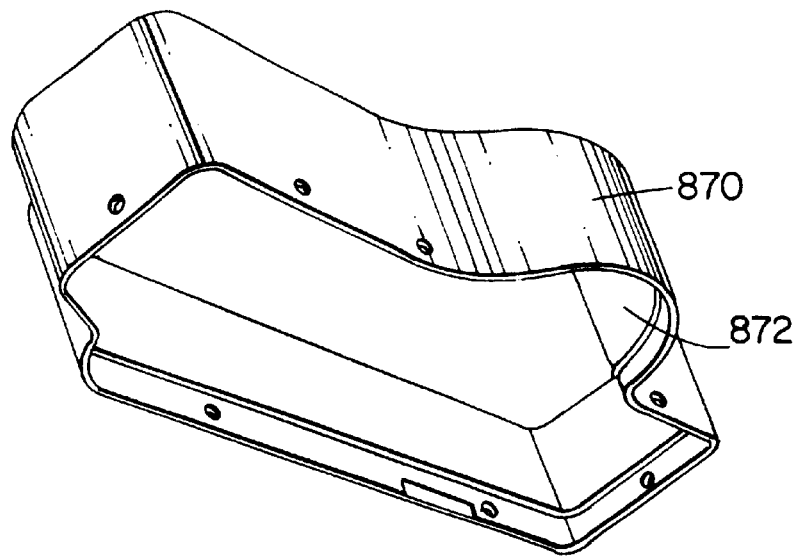
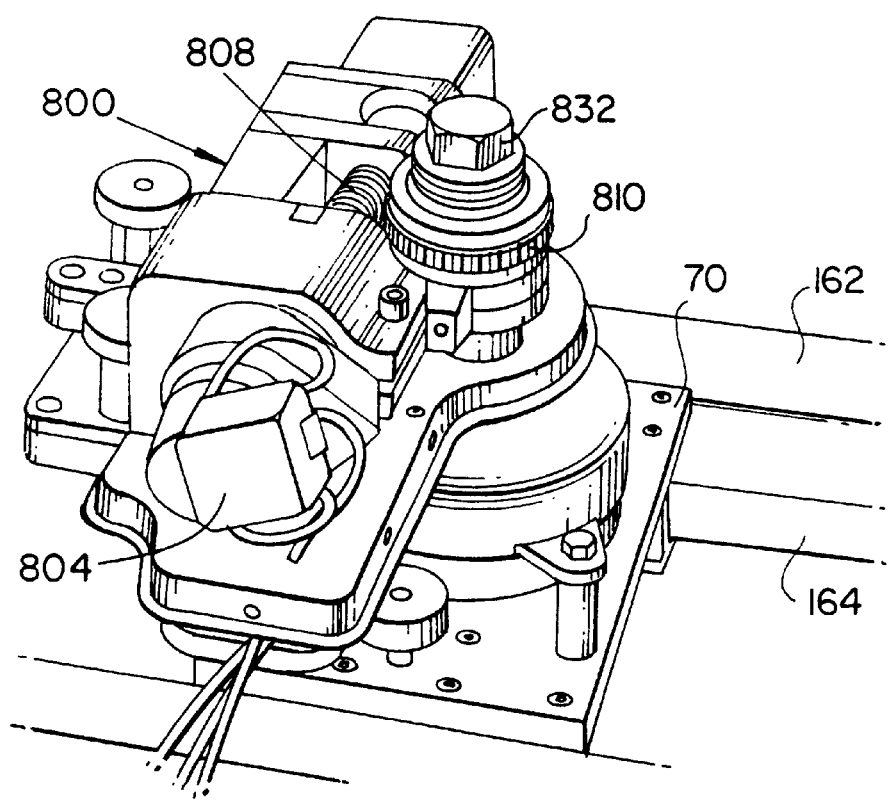
Fig. 36

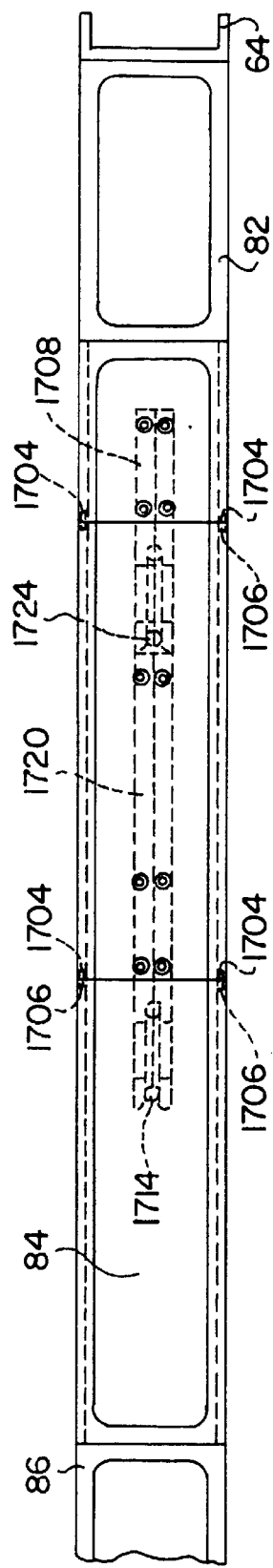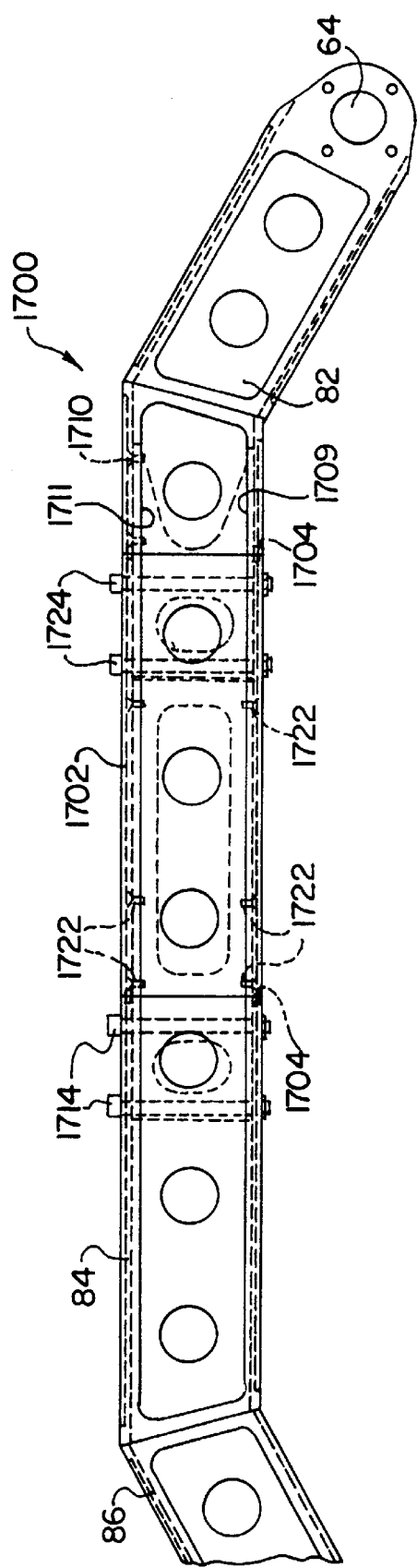
Fig. 39
Fig. 38

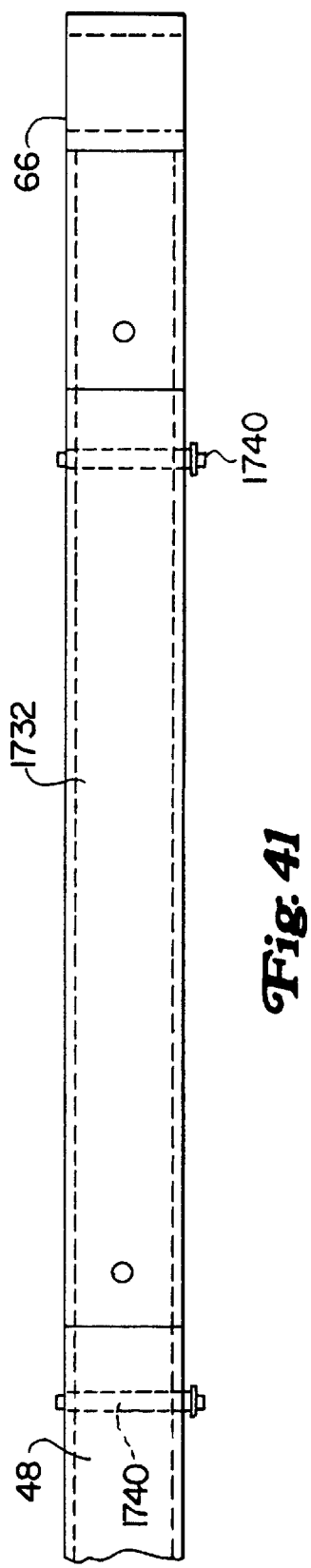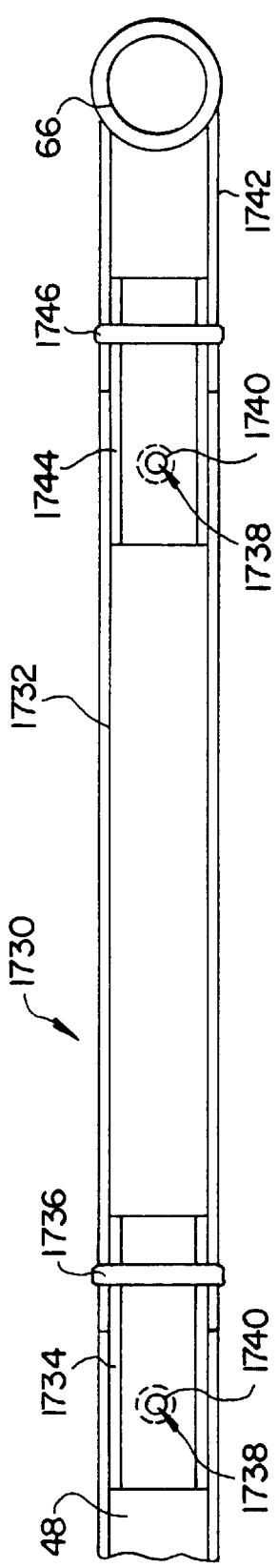
Fig. 41
Fig. 40

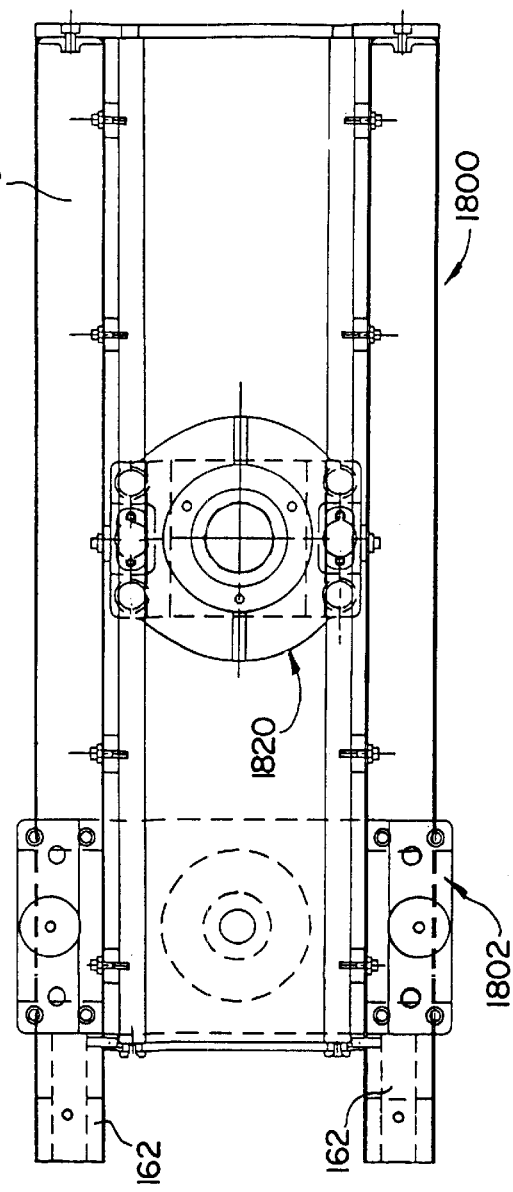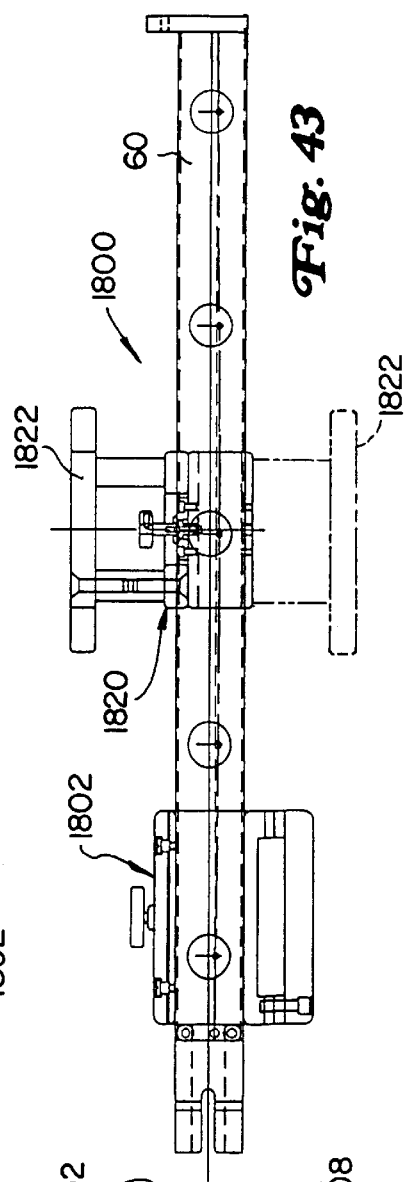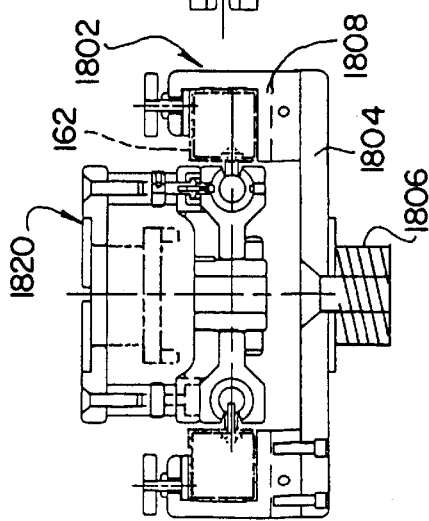

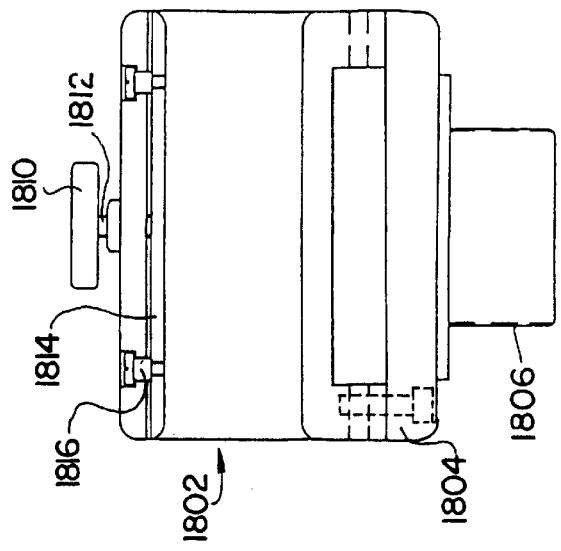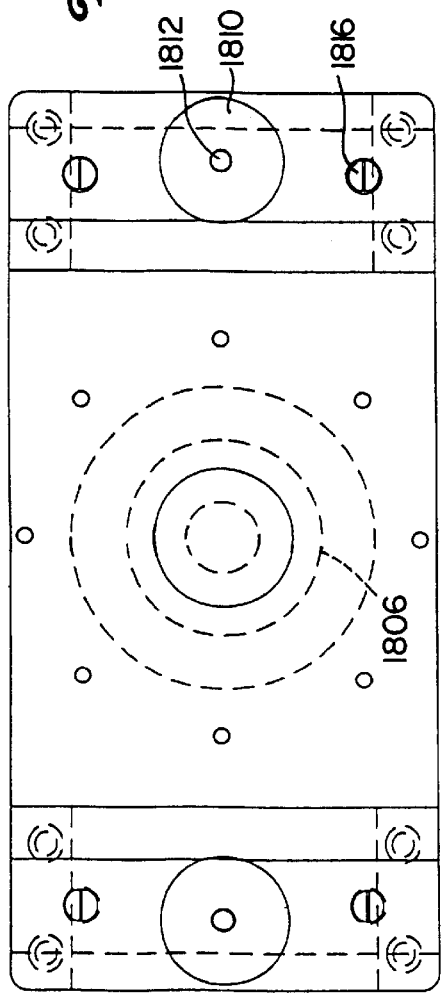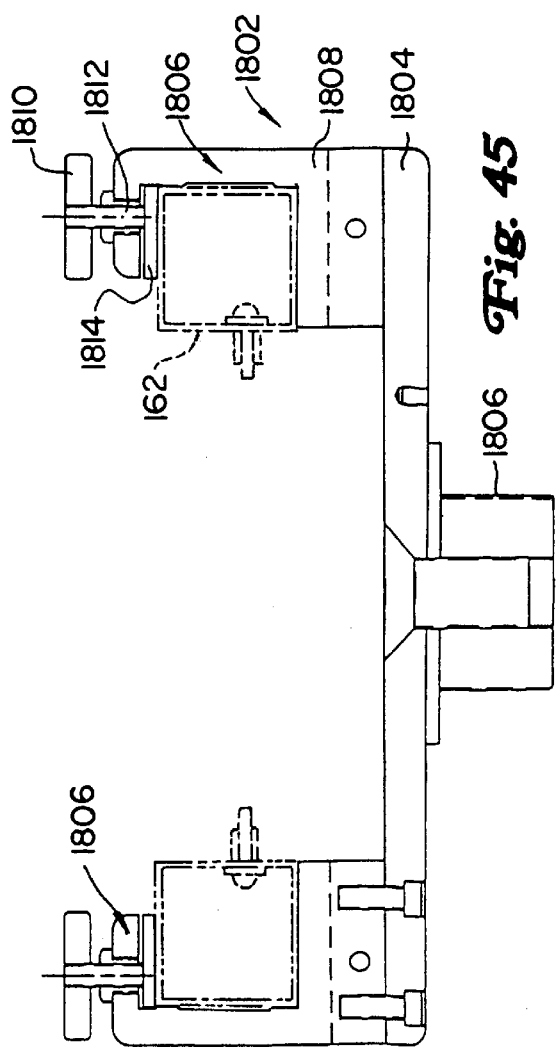

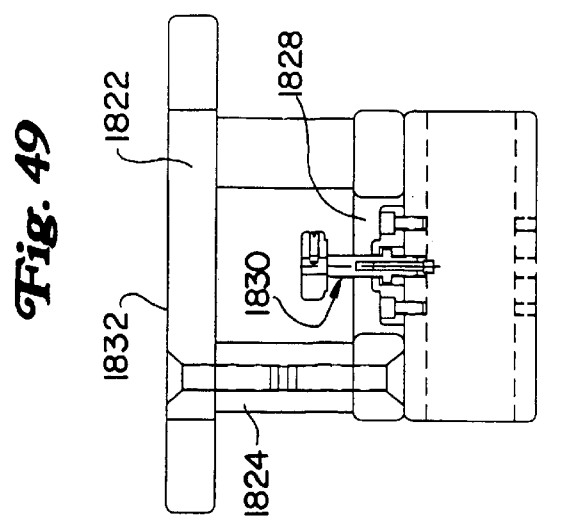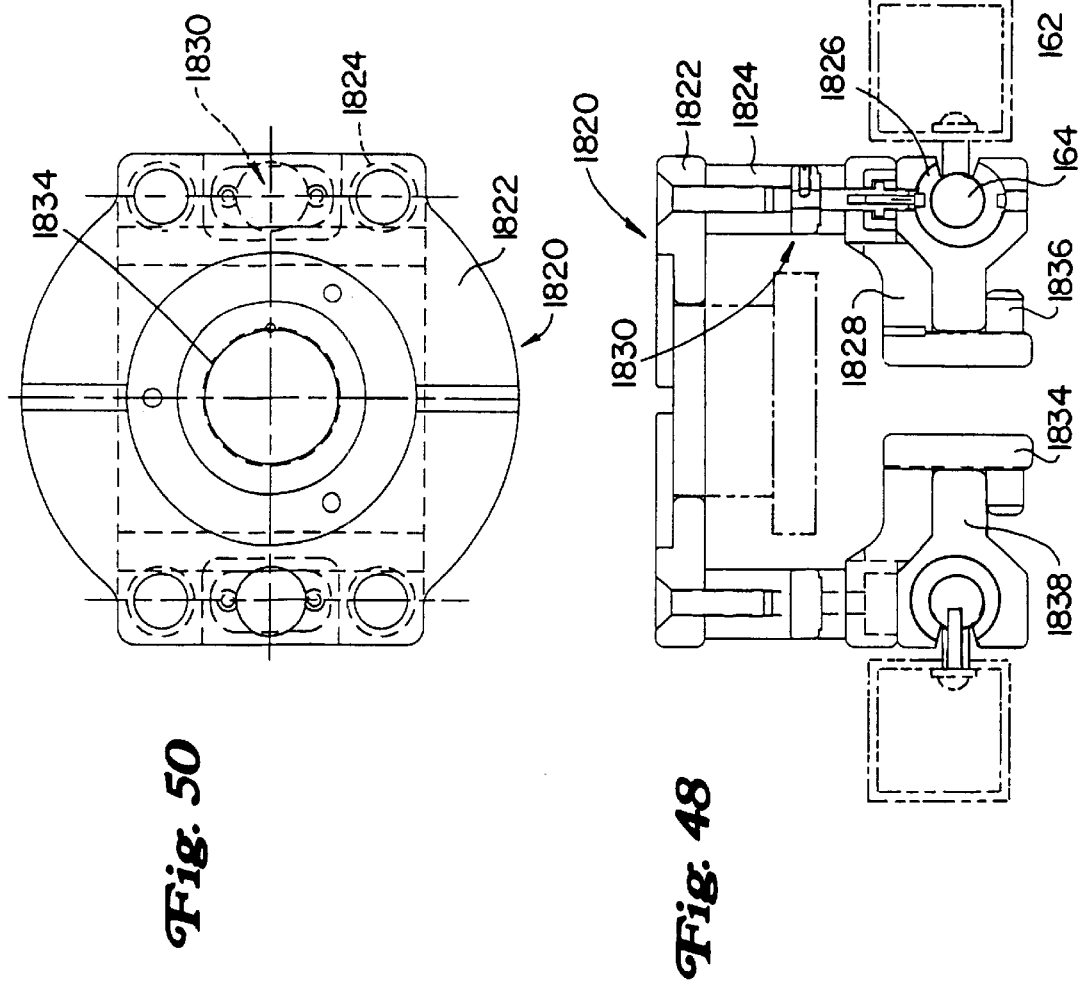

CAMERA CRANE

This Application is a Continuation-in-Part of Ser. No. 09/840,625, filed Apr. 23, 2001, and now pending, which is a Continuation-in-Part of Ser. No. 09/616,587, filed Jul. 14, 2000, and now pending, which is a Continuation-In-Part of Ser. No. 09/584,561 filed on May 31, 2000, retained and abandoned. These Applications are incorporated herein by reference.

BACKGROUND OF THE INVENTION

The field of the invention is camera cranes and remote control systems for use with camera cranes. Camera cranes are often used in motion picture and television production. The motion picture or television camera is typically mounted on a crane arm supported on a mobile base, dolly, or truck. The mobile base may be pushed and steered by hand. Larger units, which have more weight carrying capacity, and longer reaches, typically have electric driving motors powered by onboard batteries. Some mobile bases may also serve as over the road vehicles.

Camera cranes generally have a crane arm supported on a base, with a camera platform at one end of the arm, and a counter weight at the other end. The crane arm can be pivoted by hand to raise and lower the camera, and also to pan to the left or right side. A leveling system is often included to maintain the camera platform in a level orientation, as the camera platform is raised and lowered.

With the development of high definition digital, television cameras, and remote controlled motion picture cameras, filming can be achieved with or without a camera operator behind the camera. Rather, the remotely-controlled camera may be suspended on a crane arm, with the camera operator monitoring the image captured by the camera via a remote monitor, rather than a view finder in the camera. With the camera operator, cinematographer, director, etc. directly behind the camera, and with the camera controls, (focus, iris, zoom, etc.) and view-finder readily accessible directly, camera operations may be readily achieved with well known techniques which have been in use for many years. However, with remote control cameras, as the camera is not accessible to the camera operator (because, e.g., the camera is on a camera crane platform), controlling the camera requires different techniques. Video cameras and monitors allow the camera operator to monitor camera settings and positions, and can provide a remote view finder. Camera lens angles and positions, such as pan, tilt, and dutch have been controlled using electrically remote controlled motors or actuators moving a camera platform or tilt/pan head supporting the camera. While these types of control techniques have performed with varying degrees of success, challenges remain in view of the demanding requirements of motion picture or video production. For example, the remote control movement of the camera typically must be smooth, precise and without play or backlash, precisely repeatable, silent, and versatile in terms of speeds and ranges of movement.

Accordingly, it is an object of invention to provide an improved remote camera control system and accessory.

Even with the advent of remote control systems, most filming is still performed with the camera operator, cinematographer, director, or other person behind the camera, so that the recorded image is viewed in the viewfinder of the camera, and not on a remote monitor.

Due to the variety of filming or video locations, the camera crane arm should advantageously be portable and lightweight. On the other hand, the arm must be rigid enough, when assembled, to resist bending and sagging, and to avoid excessive whipping motion of the camera during crane arm movement.

Mobile bases with crane arms supporting a camera are frequently also used in the television production of sporting events, concerts, and other televised or filmed events. While various camera cranes have been widely known and successfully used, certain disadvantages remain. One disadvantage is that the presence of the crane structure around the camera can interfere with the camera operator, cinematographer, director, etc., e.g., by preventing them from taking a desired position, usually behind the camera. Another disadvantage is the time required to set up a camera crane. Typically, camera cranes are provided in sections which must be bolted together to make a boom arm of a desired length. This requires time, tools, and skill. As production time is usually extremely expensive, even small time savings may be significant.

Accordingly, there is a need for an improved camera crane. There is also a need for an improved camera crane which is light weight and easily transportable, but yet which can steadily carry significant payloads, and which can position and support a camera in a wide range of positions and orientations, while also avoiding excessive interference with the camera operator. There is a further need for a camera crane which can be quickly and easily set up, preferably without the need for tools.

SUMMARY OF THE INVENTION

In a first aspect of the invention, a remote control system for controlling movement of a camera platform on a camera crane includes a shaft gear attached to a shaft extending from the camera platform. A motor in a drive accessory attachable to the camera crane turns the shaft gear, to move the camera platform e.g., in a pitching up/down, panning left/right, or rolling clockwise/counterclockwise. The drive accessory preferably has a worm gear on a motor shaft extending out of the motor, with the worm gear engaging the shaft gear. Advantageously, a spring acts to keep the worm gear engaged with the shaft gear.

In a second and separate aspect of the invention, a clutch limits the torque which may be exerted on the shaft gear. The clutch allows the shaft gear to slip relative to the camera platform, when a predetermined level of torque is exceeded. Consequently, the potential for damage to the gear and other components resulting from bumping (or other large unexpected forces on the camera platform), is reduced. Preferably, the clutch includes a tensioning bolt which compresses a spring acting on one or more pressure plates pressing against the shaft gear. A tension limiter is preferably included to limit the maximum amount of torque which can be exerted on the shaft gear via the clutch.

In a third and separate aspect of the invention, remote control movement of a camera platform on a camera crane is provided by an accessory which is attached to the crane, to provide for remote control movement, and which is removed from the crane, when not in use by (e.g., when the camera platform is moved or positioned by hand). The accessory advantageously includes a shaft gear rotatably supported in an accessory housing. When the accessory is installed, the shaft gear is connected to the camera platform, preferably via an accessory shaft extending out of the housing and connected to the camera platform. A drive motor gear, preferably a worm gear, is engaged with the shaft gear, and driven by a drive motor within the housing. The accessory housing is preferably pivotably attached to the crane, or a frame on the camera crane, with a spring urging the accessory housing in a direction to engage the drive motor gear with the shaft gear. A remote control box may be linked to the drive motor by a cable, to provide control signals and power from a remote location. Alternatively, control signals may be provided to the drive motor by a wireless link, and power provided by batteries on the camera crane. The remote control box preferably includes a precision control joystick which allows for a full range of movement, but with precise control.

In a fourth and separate aspect, a camera crane includes a boom arm pivotally connected to a post assembly adapted to be supported on a camera dolly. A track section is attached at the front end of the boom arm, and a counter weight platform is attached at the back end of the boom arm. Leveling rods extending between the track section and counter weight platform to maintain the track section and counter weight platform in a horizontal orientation, as the boom arm is pivoted or tilted up and down, to change the elevation of the camera. A camera frame is linearly movable along the track section. As a result, the camera can be easily moved into a wide range of positions.

In a fifth and separate aspect of the invention, the boom arm has a joggle section, to provide additional head room clearance around the camera.

In a sixth and separate aspect of the invention, the camera frame is rotatably supported on the track section, so that the camera can pan continuously in either direction, clockwise or counter-clockwise.

In a seventh and separate aspect of the invention, a camera platform is pivotally or rotatably attached to the camera frame. The camera is attached to the camera platform. As a result, the camera can continuously change elevation angle, with the camera lens positioned, e.g., vertically straight up or straight down, and at any angle in between.

In an eighth and separate aspect of the invention, and counter weight platform and counter weights are concave with a rounded back surface, to minimize the clearance space needed to turn the boom arm, while providing an extended range of camera lens height.

In a ninth and separate aspect of the invention, and anti-backlash or motion control pivot joint or device is provided on the boom arm and camera frame, to provide for smooth dampened back lash free movement.

In a tenth and separate aspect of the invention, a light-weight one piece camera crane is provided which can be quickly set up without tools.

In an eleventh and separate aspect of the invention, a track section on the crane can be quickly removed and replaced with an accessory to provide different camera mounting positions and a more compact and lightweight design.

In a twelth and separate aspect of the invention, roll movement is provided via an alternative camera frame design or via a roll movement accessory attached to a camera a base plate supported by the crane.

The invention resides as well in sub combinations of the features as described below. Additional features and advantages will appear hereinafter.

BRIEF DESCRIPTION OF THE DRAWINGS

In the drawings, wherein the same reference number indicates the same element, throughout the several views:

FIG. 1 is a perspective view of the present camera crane mounted on a camera dolly, with the crane boom arm in an elevated position;

FIG. 3A is a side elevation view of the boom arm shown in FIGS. 1 and 2;

FIG. 4A is a section view taken along line 4A—4A of FIG. 3A;

FIG. 5A is a section view taken along line 5A—5A of FIG. 3A;

FIG. 6 is a plan view of the camera crane of FIG. 3A;

FIG. 8 is a front view, in part section, or an alternative camera frame for use with the crane shown in FIG. 3A;

FIG. 9 is a side view of the camera platform support plates shown in FIG. 8;

FIG. 10 is a plan view of a vibration isolator for use with the camera crane shown in FIGS. 1–3A;

FIG. 11 is a side view thereof;

FIG. 12 is a top view of mounting block for use with a removable track section;

FIG. 13 is side of a removable track section;

FIG. 14 is front end view of the removable track section installed on the crane shown in FIGS. 1–6;

FIG. 15 is a top view of an accessory for providing roll movement;

FIG. 16 is a side view of the accessory shown in FIG. 15;

FIG. 17 is a side view of another accessory;

FIG. 25 is a side view, in part section, of a joystick control unit, with the stick in the zero, neutral or center position.

FIG. 26 is a partial side view thereof, illustrating the pivoting movement of the second housing relative to the first housing of the joystick control unit shown in FIG. 25.

FIG. 28 is a side view of the joystick controller shown in FIG. 25, with the stick at a 45° position.

FIG. 29 is a side view of the cam shown in FIGS. 25 and 28.

FIG. 30 is a front view thereof.

FIGS. 31A, 31B, 31C and 31D show alternative cam designs.

FIG. 33 is a plan view of the control box shown in FIG. 1.

FIG. 34 is a section view taken along line 34—34 of FIG. 33.

FIG. 35 is a top perspective view of the accessory shown in FIGS. 22–24 with the cover installed and with the bolt cap removed.

FIG. 36 is an exploded perspective view of the accessory shown in FIG. 36.

FIG. 38 is a side view of an alternative boom arm, including an extension section;

FIG. 39 is a top view thereof;

FIG. 40 is a side elevation view of a leveling rod for use with the boom arm shown in FIGS. 38 and 39;

FIG. 41 is a top view thereof;

FIG. 42 is an end view of a track section accessory, which may be attached directly to the platform of a camera dolly, such as the camera dolly shown in FIG. 1, or to other dollies or cranes;

FIG. 43 is a side view thereof;

FIG. 44 is a top view thereof;

FIG. 45 is an end view of the track section frame shown in FIGS. 42–44;

FIG. 46 is a side view thereof;

FIG. 47 is a top view thereof;

FIG. 48 is an end view, in part section of the slide head shown in FIGS. 42–44;

FIG. 49 is a side view thereof; and

FIG. 50 is a top view thereof.

DETAILED DESCRIPTION

Figure 2:
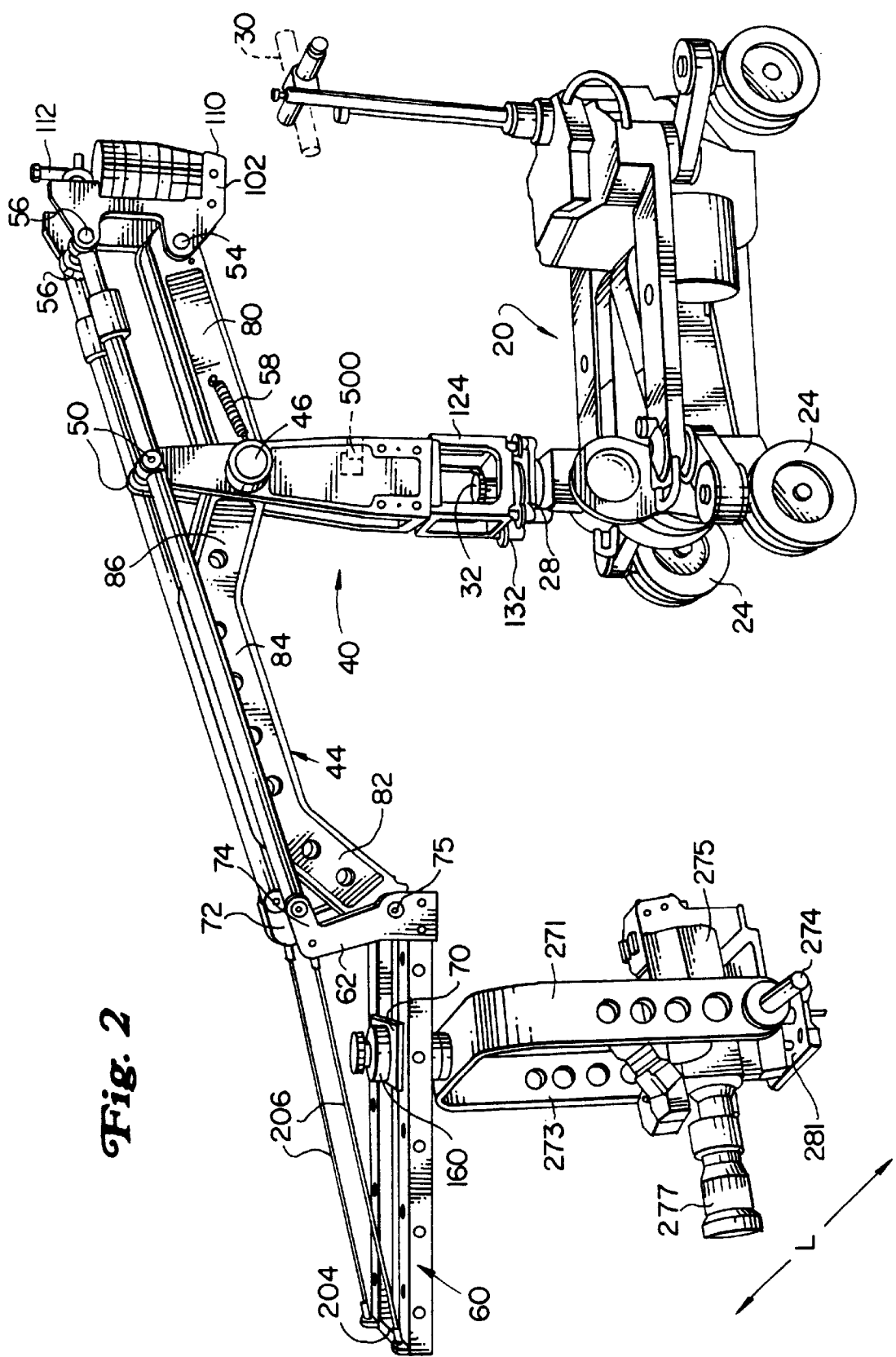
FIG. 2 is a perspective view thereof with the boom arm in a lowered position.

Turning now in detail to the drawings, as shown in FIGS. 1 and 2, a camera crane 40 is supported on a dolly platform 28 of an arm 26 of a camera dolly 20. The dolly wheels 24 and arm 26 are attached to a dolly chassis 22. The camera dolly is described in detail in U.S. Pat. Nos. 6,109,626 and 4,360,187, incorporated herein by reference.

Referring to FIGS. 1–3A, the crane 40 includes a boom arm 44 pivotally supported on a post assembly 42. The post assembly 42 is pivotably attached to a head frame 124 which is connected to the dolly platform 28. The head frame includes a leveler 132 having jack screws or other leveling devices, such as described in U.S. Pat. No. 6,086,207, incorporated herein by reference. The leveler 132 allows the entire crane 40 to be leveled with respect to the dolly platform 28.

The boom arm 44 is pivotally connected to the post assembly 42 for vertical movement at a boom arm center pivot joint 46. A pair of leveling rods 48, are spaced apart on either side of the boom arm 44. The leveling rods 48 are also pivotally attached to the post assembly 42 at leveling rod center pivot joints 50.

A counter weight platform 52 is pivotally attached to the boom arm 44 at a boom arm rear pivot joint 54. The leveling rods 48 are similarly attached to the counter weight platform at leveling rod rear pivot joints 56.

A track section 60 is rigidly attached to a track section arm 62. The track section arm 62 is pivotally attached to the front end of the boom arm 44 at a boom arm front pivot joint 64. The leveling rods 48 are similarly pivotally attached to the track section arm 62 at leveling rod front pivot joints 66.

Referring still to FIGS. 1–3A, the boom arm 44 has a rear segment 80 which is parallel to the leveling rods 48, and which is horizontal, when the boom arm 44 is horizontal. A first front segment 82, second front segment 84, and third front segment 86 are joined together, with the third front segment 86 also joined to the rear segment 80. As shown in FIG. 3A, the third front segment 86 is joined at a rise angle to the rear segment 80. The angle θ is generally from 15–45°, and preferably about 30°. The second front segment 84 is joined to the first front segment 82 at an angle supplementary to angle θ, so that the second front segment 84 is parallel, but vertically offset, from the rear segment 80. The third front segment 86 is likewise joined to the second front segment 84 at angle negative θ. The first front segment 82 preferably is of the same length as the third front segment 86, so that the upward rise resulting from the inclined third front segment 86 is equally offset by the decline of the first front segment 82. As a result, the pivot joints on the boom arm 44, i.e., the boom arm rear pivot joint 54, the boom arm center pivot joint 46, and the boom arm front pivot joint 64, are all aligned on the center line C—C. However, a head room space, generally designated 45 in FIG. 3A, is formed between the boom arm 44 and the floor. As a result, the camera operator has additional vertical clearance space or head room, extending from line D to the bottom surface of the boom arm 44.

The segments 80, 82, 84 and 86 are preferably formed from an aluminum 4"×4" square beam tube extrusion, having a ¼ inch wall thickness, wedge cut to form the angle joints which are pressed closed, and then welded. To reduce weight, the central areas of the sides, top and bottom surfaces of the boom arm 44 are reduced in thickness, forming relieved wall sections 88, on all surfaces. In addition, lightening holes 90 are advantageously provided along the center lines of each of the front segments, on the sides, top and bottom. The relieved sections 88 are preferably made by reducing the wall thickness of the box beam used to form the boom arm 44 from ¼ inch to ⅛ inch, thereby reducing the weight of the boom arm 44 by almost 50%. The metal thickness at the edges is retained for improved rigidity and weld strength. As the majority of the surfaces of the boom arm are relieved areas, they have increased protection against scratches and other damage.

Referring to FIG. 3A, the counter weight platform 52 is formed by a bottom plate 102 and a front wall 104. A weight post 112 extends vertically upward from the bottom plate 102. Counter weights 106 are stacked onto the counter weight platform 52, with the post 112 extending through clearance holes in the counter weights 106. As shown in FIG. 6, the counter weight 106 have a radiused back surface 108. This allows the boom arm 44 to pivot about on the dolly platform 28 with a minimum of clearance.

As shown in FIG. 3A, the bottom plate 102 also has a forwardly curving relieved section 110, to allow the counter weight platform 52 to better clear the dolly steering handle 30, as shown in FIG. 2, when the handle is at 90°. Also, as show in FIGS. 3A and 6, the camera frame 68 is rotatably attached to a frame slider plate 70 which is slidable forward and back on the track section 60.

Figure 4B:
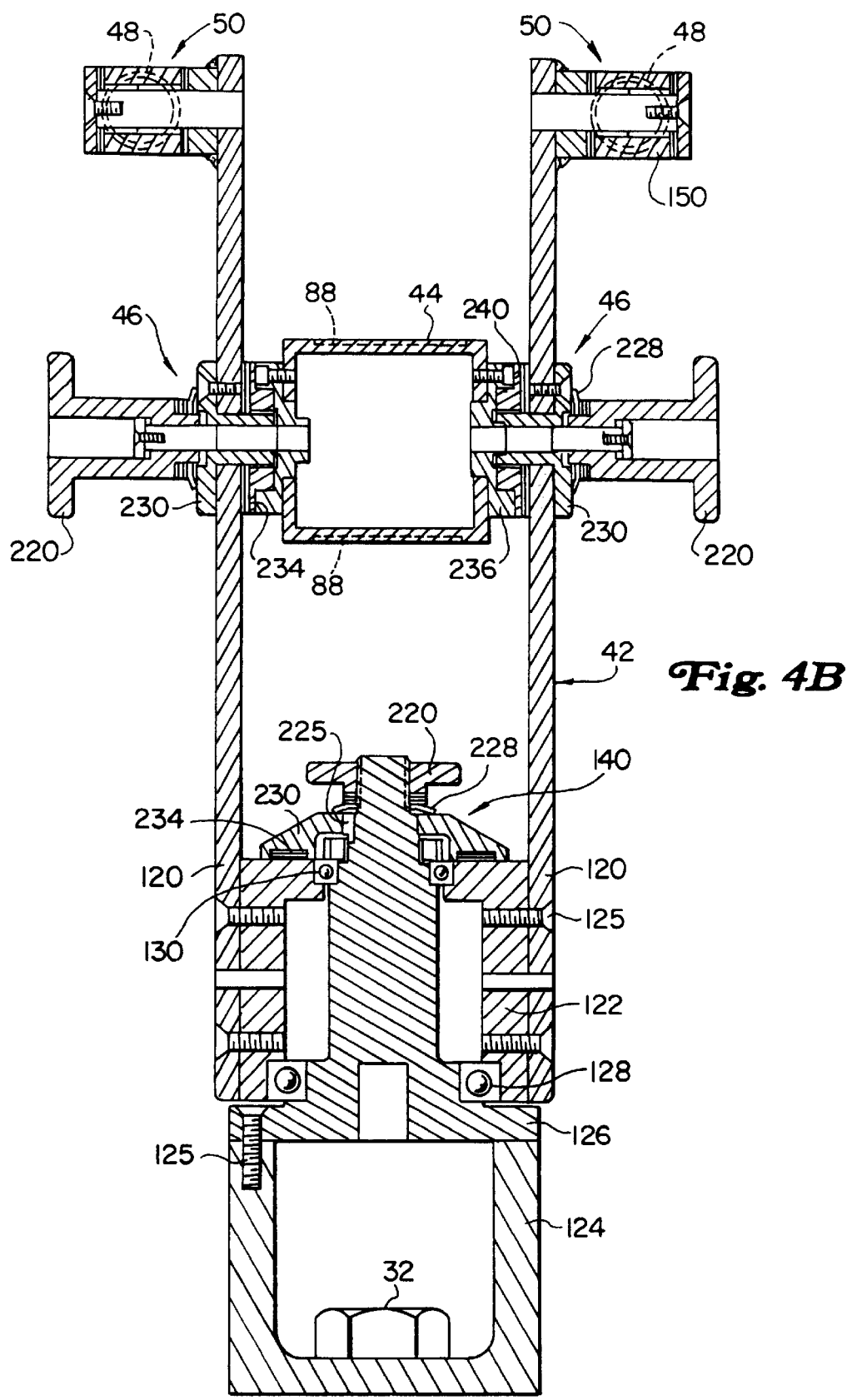
FIG. 4B is an enlarged view of FIG. 4A.

Referring to FIG. 4B, the post assembly 42 includes spaced apart slide plates 120 attached to a base collar 122 via bolts 125. The base collar 122 is rotatably supported on an axle 126, via an upper bearing 130 and a lower bearing 128. The axle 126 is bolted on to the head frame 124, which in turn is secured to an upper plate or structure of the leveler 132. A lower section of the leveler is attached to the dolly platform 28 with a threaded knob 32. A crane pan pivot joint 140 is located between the side plates 120 and on top of the axle 126. The crane pan pivot joint 140 adjusts the drag or braking force when pivoting the crane 40 about the head frame 124 and camera dolly platform 28. Lateral stubs 50 extend outwardly from the top ends of the side plates 120, to support the leveling rod center pivot joints 50. A key 225 irrotatably secures the cap plate 230 to the axle 126.

Figure 5B:
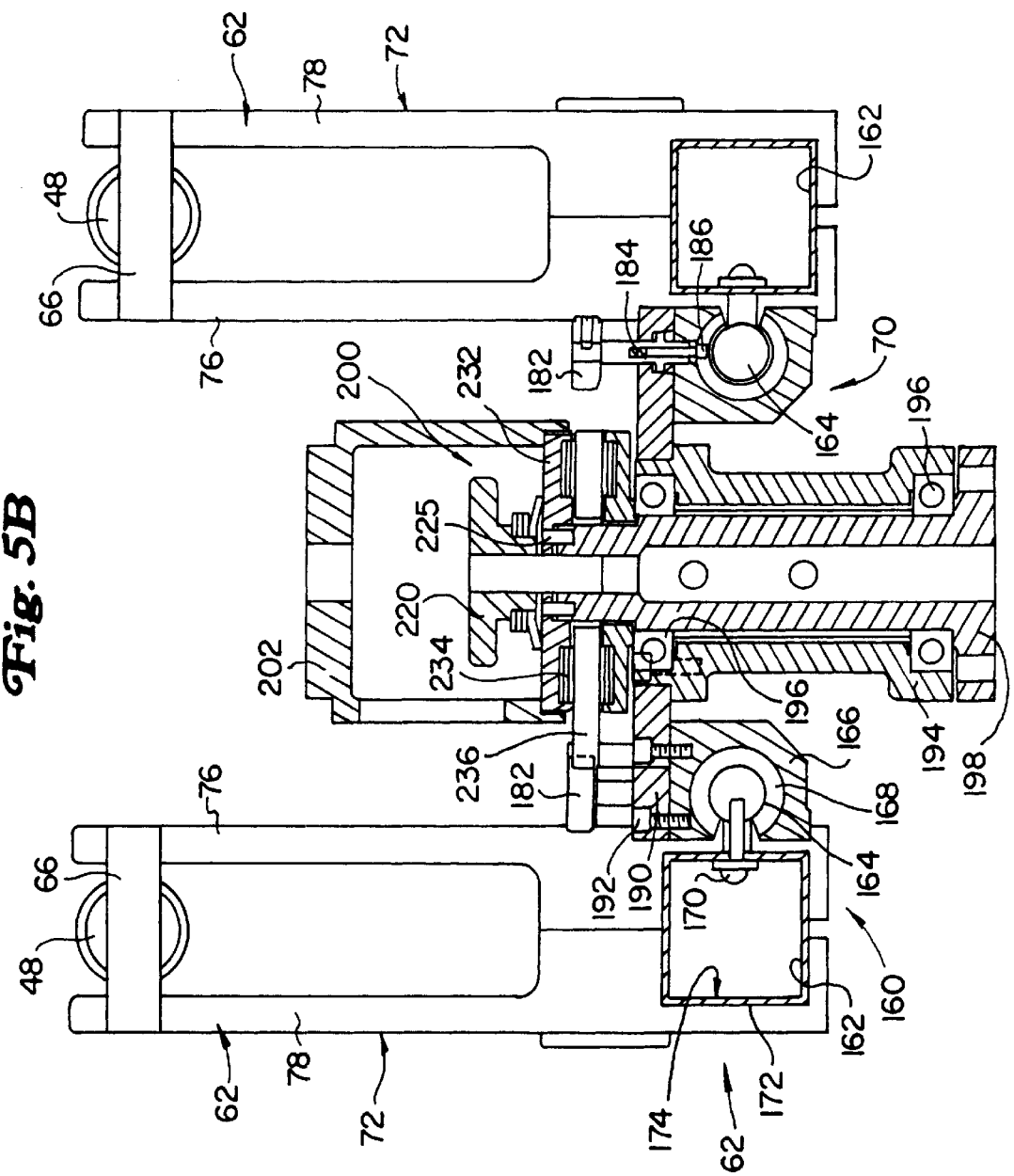
FIG. 5B is an enlarged view of FIG. 5A.

As shown in FIGS. 3, 5B and 6, the track section 60 includes two square track tubes 162 attached to and extending parallel and forward from the track section arm 62. The track tubes 162 are preferably made of stainless steel two inch by two inch square tubes with a 0.083 wall thickness. The track section 62 includes left and right arm assemblies 72 and 74 fixed to and joined by a cross shaft 75. Each of the arm assemblies 72 and 74 includes inner and outer plates 76 and 78, with the leveling rod front pivot joints 66 positioned between the inner and outer plates from both the left and right arm assemblies 72 and 74, as shown in FIG. 5B.

Referring still to FIG. 5B, the frame slider plate assembly 70 is slidable front to back on track bearing rails 164 attached to the inside of each track tube 162, via rail bolts 170. Bearing blocks 166 are attached to the slide plate 190 with fasteners 192. Clearance holes 172 are provided on the outside of the track tubes 162, to access to bolts 170. A linear rod bearing 168 is secured within the bearing block 166, on each side, and allows the frame slider plate assembly 70 to slide front to back on the track bearing rails 164 with low friction. The track section 60 in the embodiment shown allows for 24 inches of sliding horizontal linear travel. The back ends of the track rails 164 are attached to a bridge plate 165 extending between the track tubes 162 at the back end of the rail section 60. The front ends of the track tubes 162 are attached to the front end plate 204.

A frame slider plate assembly drag adjuster 180 on the slide plate 190 has a bushing 186 on the tip of a thumb screw 182 threaded into the slide plate 190. A spring 184 urges the bushing 186 outwardly into sliding engagement against the track bearing rail 164. The sliding friction of the frame slider plate assembly 70 along the track bearing rails 164 is adjusted by turning the thumb screw at 182, which increases or decreases the spring engagement force of the bushing 186 against the track bearing rail 164. The slide spring plate 190, and thus the camera frame 68, can be locked in place on the track bearing rails 164 by sufficiently tightening the thumb screw 182.

A plate collar 194 is fixed within a central opening of the slide plate 190, and extends downwardly from the slide plate 190. A track axle 198 is rotatably supported within the plate collar 194 by upper and lower bearings 196. The drag force on rotation of the track axle is adjusted with a track axle pivot joint 200.

Tension wires 206 optionally extend from the end plate 204 to the left and right arm assemblies 72 and 74, as shown in FIGS. 1 and 2.

Figure 7:
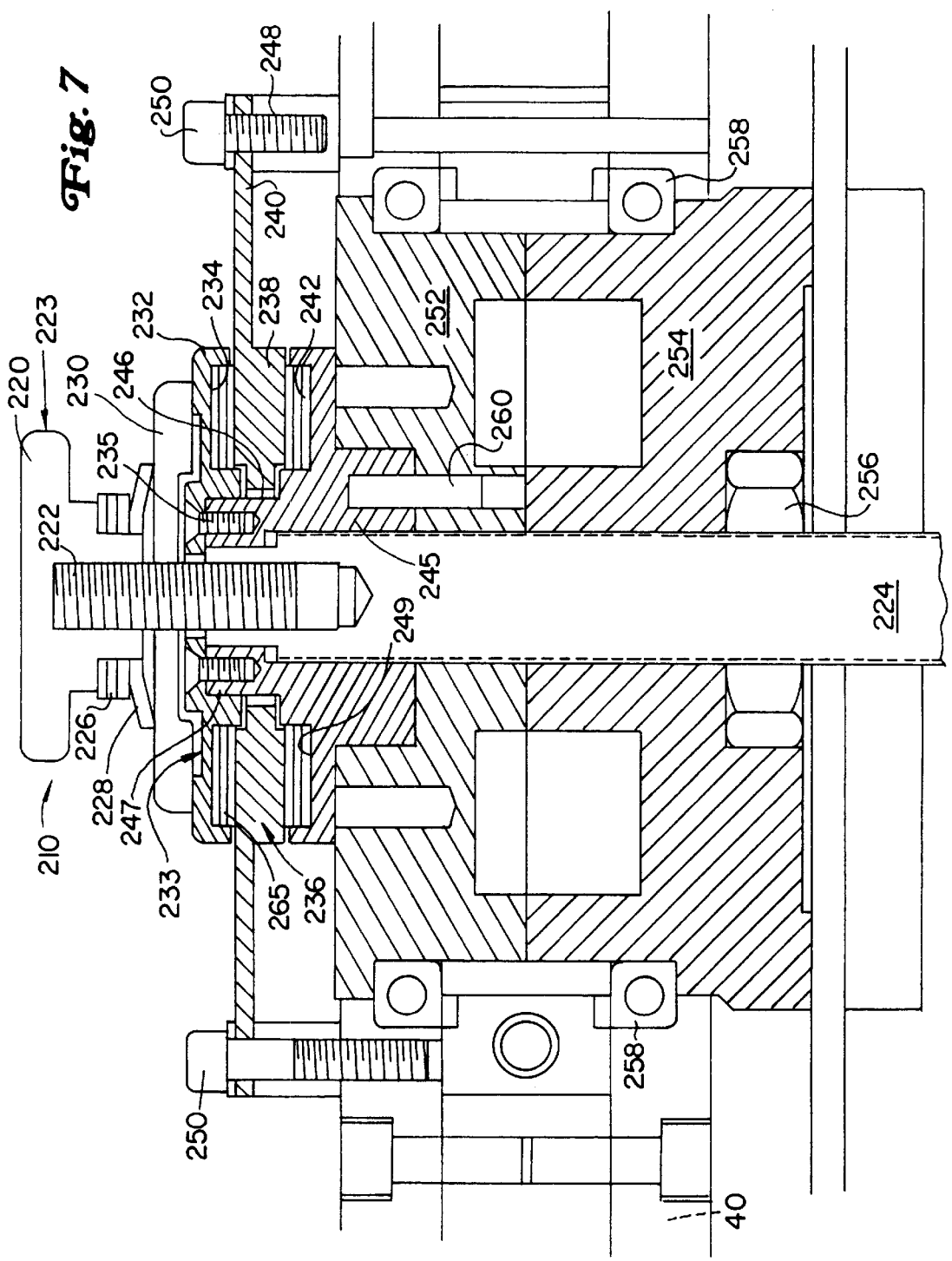
FIG. 7 is an enlarged section view of the anti backlash joints shown in FIG. 3A.

FIG. 7 shows the detailed construction of the non-slip/stick drag or pivot joints 210 used on the crane 40. The joint 210 shown in FIG. 7 is preferably used for all pivot joints on the crane 40 which have adjustable tension or drag features, specifically, the crane pan pivot joint 140 shown in FIG. 1B, the boom arm center pivot joints 46 (left and right) shown in FIG. 4B, and the camera frame pivot joint 160, as shown in FIG. 5B. While the Figures show other optional designs for the joints 140, 46, and 160, the joint construction shown in FIG. 7 is preferred for all such joints.

Turning in detail to FIG. 7, a stud section 222 of a hand knob 220 is threaded into an axle 224 forming a tensioner 223. The axle extends through an outer hub 252 and an inner hub 254 and is clamped in place by a hub nut 256. A needle thrust bearing 226 under the hand knob 220 press against a compression washer 228, which in turn presses on a floating cap plate 230, as the hand knob 220 is tightened. Other forms of tensioners, such as cams, levers or springs, may also be used in place of the hand knob and screw threads, to adjust drag joint friction.

An arm plate 236 is positioned between the flex plate 232 and axle hub 245 secured to the outer hub 252 via a pin 260. The arm plate 236 has arms 240 extending out from opposite sides of a ring section 238. The arm plate 236 is pivotally or rotatably positioned over a hub section 247 of the axle hub 245, on a DU bushing 246. A stack of Teflon rings 234 are contained within the flex plate 232, and are compressed between the flex plate 232 and the upper surface of the ring section 238 of the arm plate 236. Similarly, a stack of lower Teflon rings 242 are positioned between the lower surface of the ring section 238 of the arm plate 236, and a receiving groove 249 formed in the upper surface of the axle hub 245.

The flex plate 232 is attached to the axle hub 245 via fasteners 235. The arms 240 of the arm plate 236 are attached to the moving section, such as the boom arm 40 by clamping screw 250 extending into standoffs 248. The moving section, such as the boom arm is pivotally or rotatably supported on the hub bearing 258 on the outer hub 252 and inner hub 254.

A heavy grease 265 is provided between each of the rings 234 and 242, as well as between the top ring and the flex plate, and the bottom ring and the receiving groove 249, to further reduce friction.

Referring still to FIG. 7, the arm plate 236 pivots or rotates with the moveable section, such as the boom arm 40 or the track axle 198, while the other components remain fixed in place. The drag or braking force of the pivot joint 210 is adjusted by turning the hand knob 220. As the hand knob 220 is tightened down, the floating cap plate 230 presses down and deflects the flex plate 232 slightly, increasing the normal force clamping the flex plate 232, Teflon rings 234 and 242 and arm plate 236 together, thereby increasing the drag force. The flex plate has an annular undercut area 233 which allows the flex plate to deflect under clamping force from the cap plate 230. The deflection is generally up to 0.006 inches. When the arm, or other moveable component using the pivot joint is brought to a stop, there is no backlash, stickslip, or other force tending to move the arm out of position, as can occur with other types of pivot joints.

Referring to FIGS. 3A and 5B, the camera frame 68 is rigidly attached to the track axle 198 in the frame pivot joint 160. This allows the camera frame 68 to pivot or rotate, as well as translate in and out along the track section 60.

As shown in FIG. 3A, the camera frame 68 includes a U-section 270 suspended from the track axle 198. A base plate 272 is pivotally supported on each of the arms 271 and 273 of the U-section 270, via hand grip joints 276. The hand grip joints 276 preferably have the same construction as the other pivot joints, such as the frame pivot joint 160 and the boom arm pivot joint 46, which construction is shown in FIG. 7. However, hand grips 274 are threaded into a hub 278 attached to the camera platform 272. Turning the hand grips 274 tilts the camera platform up or down, while turning the knobs 220 sets the drag or friction on such tilting movement.

The figures are draw in proportion and to scale and generally accurately show the relative sizes and positions of the components described. As shown in FIG. 3A, the U-section 270 has a width of approximately equal to the length of the rear segment 80. This width provides space for mounting a wide variety of cameras, and includes vertical clearance for a film magazine 279, and a view-finder on the camera 275. The distance between the center line H—H of the hand grip joints 276 and the base plate 272 is set so that the line H—H passes through the center of gravity of the camera. Consequently, the base plate 272 is preferably attached to the U-section 270 so that the spacing between the plate 272 and line H—H can be quickly and easily changed, e.g., via slotted holes, etc. By setting the center of gravity of the camera 275 on line H—H, no moment is generated tending to change the elevation angle of the camera lens 277, regardless of the elevation angle. Consequently, if desired, the hand grip joints 276 can be set to virtually no drag force, without having the camera drift or shift inadvertently in elevation.

Referring to FIGS. 2–3A in use, a camera 250, such as a video, television or motion picture film camera 275 is mounted on the base plate 272, with the center of gravity of the camera 275 on line H—H passing through the hand grip joints 276. With the crane 40 attached on top of a dolly platform 28 of a camera dolly 20, counter weights 106 are added on to the counter weight platform 52, until the boom arm 44 is balanced. This balancing may be performed with the camera frame 68 at any position along the track section 60. The distance between the boom arm front pivot joint 64 and the boom arm center pivot joint 46, in the embodiment shown, is twice the distance between the boom arm center pivot joint 46 and the boom arm rear pivot joint 54. Of course, other ratios may be selected. While the short length of the crane 40 behind the post assembly 42 provides for a more compact and versatile design, it requires counter weights 160, even with no camera pay load on the camera platform 272. In the embodiment shown in the drawings, with no camera payload, the boom arm 42 is counterbalanced with about 95 pounds on the counter weight platform 52. Payloads may range from 10–100 lbs. with a preferred maximum of about 60 lbs.

To set up the crane for use, the camera is attached to the camera platform 272. Counter weights 106 are added until the arm is balanced, preferably with the crane in a horizontal position. Referring to FIG. 3A, once the crane is balanced, it will remain balanced, regardless of the in/out position of the camera frame 68. Although the center of gravity of the entire crane 40 will change with in/out movement of the camera frame 68, the arm 44 will remain balanced. This occurs because the downwardly vertical force acting through the joint 64, resulting from the weight of the camera frame 68 (and the entire track section 60) does not change as the camera frame 68 moves in and out. The moment exerted about the joint 64 changes with movement of the camera frame 68 and its camera payload. Consequently, with the camera frame 68 at the very front or out position, next to the end plate 204, the moment acting about the joint 64 is at a maximum. However, this moment is countered by the tension in the leveling rods. As the vertical force acting downwardly through the pivot joint 64 remains unchanged, the boom arm remains balanced, regardless of the front to back movement of the camera frame 68. Thus, after the boom arm is balanced, it will remain balanced, regardless of the movement or position of the camera frame 68 and the camera payload. Bubble levels 55 attached to the boom arm may be used for the initial leveling step.

As the boom arm moves from horizontal towards a more vertical up or down position, less force is required to counter balance the weight of the pay load, and the weight of the boom arm forward of the joint 46. This occurs because as the arm moves from horizontal to vertical, the stresses change from bending to compressive stresses. As a result, the shape of the arm changes slightly, and it becomes straighter. As the arm becomes straighter, the distance between the pivot joint 46 and the center of gravity of the load forward of the joint 46 decreases, so that less counterweight is needed. An arm spring 58 extending between the rear segment 80 and the post assembly 42 is preferably provided, to compensate for the reduced counter weight load needed as the boom arm 42 moves away from a horizontal position. The force applied by the spring 58 is minimal when the boom arm is horizontal. The force exerted by the spring 58 increases as the arm moves away from horizontal, with the spring force always acting to return the boom arm to horizontal.

The pivot joints, i.e., the crane pan pivot joint 140, frame pivot joint 160, boom arm pivot joint 46, and hand grip joints 276, are tightened to provide the desired degree of drag, which may vary for different applications, and according to the camera operator's personal preferences. For example, for prolonged filming with the camera lens fixed in a specific position, the joints may be tightened, to prevent any inadvertent movement of the lens 277, caused, for example, by air movement, vibrations, etc. On the other hand, where frequent, constant, or rapid camera movements are required, the pivot joints may be set with minimal drag.

The camera frame 68 can be moved in or out to different positions along the track section 60. If the camera lens 277 is perfectly horizontal (level) with the camera frame 68 at the mid-point of the track section 60, the lens 277 will experience a slight decline in angle as the camera frame 68 is moved out to the front end 61 of the track section. This occurs because the track section 60 tips down slightly under the added moment resulting from the pay load at the front end 61 of the track section 60. The downward deflection is caused primarily by compression of the wheels or tires 24 on the dolly 20, under the added load. Similarly, if the camera frame 68 is moved all the way back, adjacent to the track section arm 62, the relative reduction in load will cause the track section 60 to rise slightly, from back to front, so that the lens angle is now above horizontal. Again, this results primarily from the elasticity material characteristics of the wheels. The boom arm 42 itself, including the track section 60 have relatively high bending moments of inertia, relative to the pay loads carried. Consequently, although they of course deflect slightly with changes in pay load position; their contribution to the change in camera angle as the camera frame 68 moves in and out, is minimal.

Figure 3B:
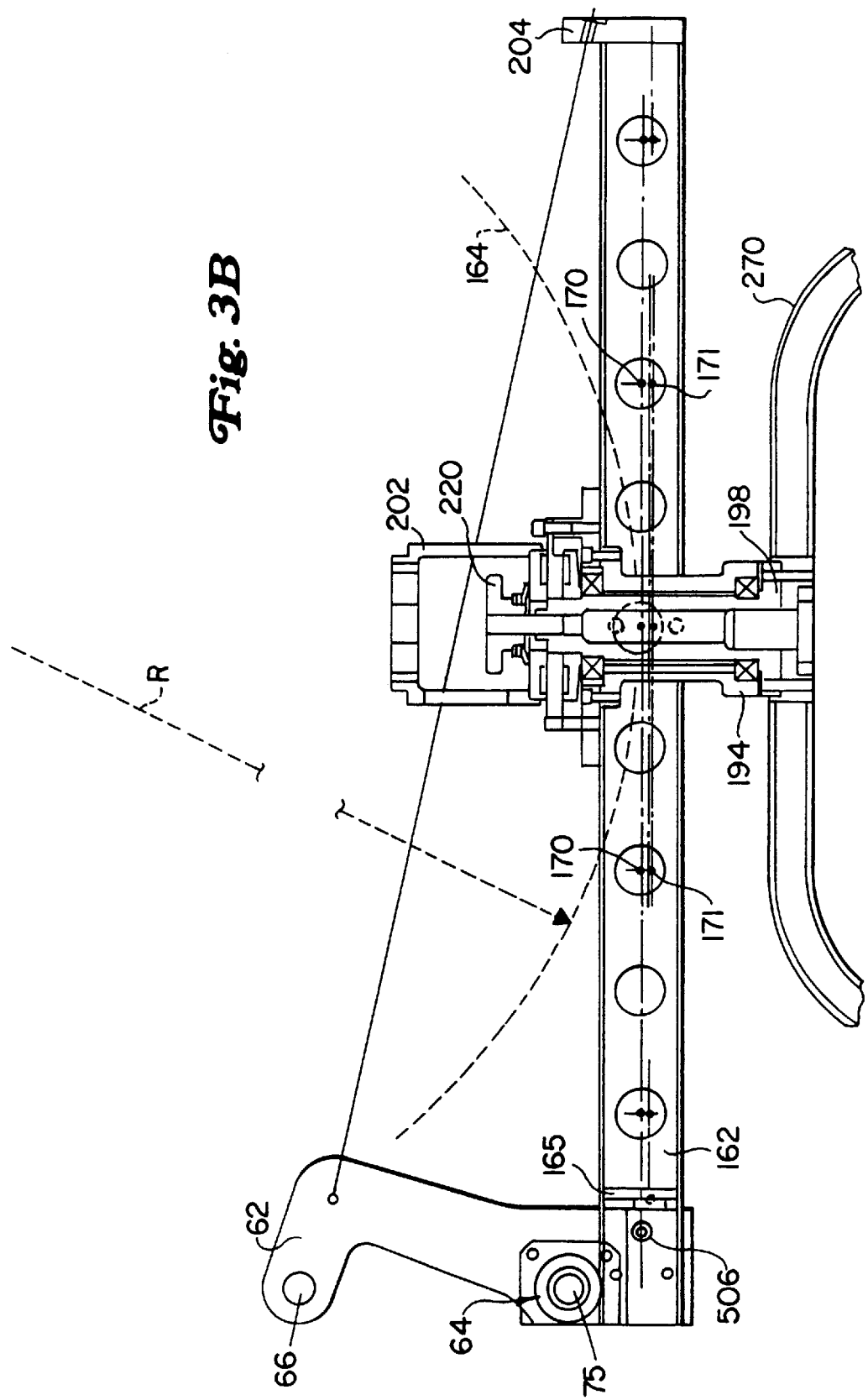
FIG. 3B is an enlarged view of the track section shown in FIGS. 3A.

Referring to FIG. 3B, to compensate for the unwanted change in camera angle as the camera frame 68 moves along the track section 60, the track bearing rails 164 are preferably provided with a slight convex curvature. This convex curvature is preferably provided by deflecting the track bearing rails 164 to the desired curvature (with e.g., a press), and then tightening the rail bolts 170, shown in FIG. 5B, to clamp and hold the track bearing rails 164 into the desired curvature. As shown in FIG. 3B, this is achieved by having a second set of interior through holes 171 in the inside wall of the track tubes 162, with the holes 171 located on a very large radius R to hold the track bearing tubes 164 into the convex curvature. The curvature of the rails 164 in FIG. 3B, shown in dotted lines, is greatly exaggerated, for purposes of illustration.

With the track bearing rails 164 curved into the radius as described above, the camera 275 is leveled with the camera frame 68 at the center of the track section 60. Then, when the camera frame 68 is moved out to the front end 61 of the track section 60, the frame slider plate is located on a slightly inclined section of the radius, which ordinarily would cause the camera elevation angle to rise. However, the added moment or load resulting from the camera frame 68 at the end of the track section 60 causes the dolly wheels to deflect and compress, which along with the slight additional amount of strain in the metal of the boom arm 44 results in the camera elevation angle remaining substantially unchanged. Similarly, when the camera crane 68 is moved back adjacent to the track section arm 62, the reduced load on the dolly wheels and boom arm 40 would ordinarily cause an increase in camera angle elevation. However, as the frame slider plate 70 is now on a "downhill" section of the radius of the track bearing rails 164, the camera elevation angle remains substantially unchanged. As a result, the camera frame 68 may be moved to any position along the track section 60, without significantly changing the camera elevation angle.

The radius is preferably large, as only a slight amount of deflection occurs with movement of the camera frame 68 along the track section 60. Preferably, the radius ranges from 400–1200 inches, more preferably, about 600–1000 inches, and more preferably from 750–850 inches. In the specific embodiment shown in the figures, radius is 812 inches. The desired value of the radius R will of course vary with the deflection characteristics of the wheels or tires 24 and of the boom arm 42. The radius R may be matched to the dolly and crane 40 by setting them up for actual use; placing a load on the camera frame to simulate the weight of the a camera; and leveling the boom arm with the rails initially straight. The rails are then set at an estimated radius, e.g., 800 inches. A level indicating device, such as a laser is attached to the camera platform, and the frame 68 is moved to the front and to the back of its range of travel, while observing the level indicator. If the level rises at the back and declines at the front, then more curvature is needed. The fasteners 170 are loosened, the rails 164 are pressed into a tighter curve to reduce R, the fasteners retightened, and the level testing is again observed. This process may be repeated until the change in level of the camera platform from the front of the rails to the back, is reduced to an acceptable amount.

Referring to FIGS. 1–3, the boom arm 44 can pivot about the boom arm center pivot point 46 by about plus or minus 60 degrees. Many known crane or boom arms have semi undesirable pinch or shear points between their moving parts. As a result, a crane operators hands or arms, or other pieces of equipment such as cables, can be caught in the pinch points. However, the boom arm 44 avoids such pinch points, via the geometry of the leveling rods 48 and their attachment points. Specifically, as shown in dotted line in FIG. 3, with the arm 44 in the maximum up position, the upper end of the front wall 104 of the counter weight platform 52 comes close to the top surface of the rear segment 80, at location P. However, sufficient clearance remains so that an operator's hand cannot become trapped between the moving parts. Similarly, at the front end of the boom arm 44, at location Q in FIG. 3, clearance space remains between the leveling rods 48 and the track section arm 62, to prevent trapping an operators hand, cables, or other objects. Potential pinch points are reduced via the offset design of the leveling rods 48. As shown in FIG. 3A, the leveling rods are offset to the sides of the boom arm 44, reducing pinch points. In addition, as shown in FIG. 3A, the leveling rods 48 extend beyond the height of the boom arm 44 by only a slight amount, generally equal to one half of the height or diameter of the leveling rods 48. This reduces the space taken up by the crane 40, providing a more compact design which is advantageous for use in tight spaces, and for shipping. Crane movement due to wind is also reduces by the reduction in cross section achieved by the location of the leveling rods 48.

The non-tensionable or adjustable pivot joints, such as the leveling rod rear pivot joint 56 and front pivot joints 66 and the boom arm front pivot 64 are preferably provided with Teflon washers and needle bearings, for smooth, quiet and low friction pivoting movement. Stop pads 300 made of open cell urethane foam, or sorbathane foam are provided at the hard stop points of the boom arm 42, and at the front and the back ends of the track section 60. The pads 300 prevent a metal to metal stop at the limit of pivoting or linear travel. The open cell polyurethane foam, or sorbathane foam is preferred, because it compresses to dampen and absorb movement, but exerts very little kick back or press back force. Consequently, even at the limits of travel, there is no slip/stick movement and little or no backlash, i.e., inadvertent movement in an opposite direction. Vertical boom travel stops are similarly provided by a pad 500 on the post assembly 42.

Referring to FIGS. 1–3, with the crane 40 mounted on the camera dolly 20, the dolly 20 can be maneuvered in any direction to position the camera 275 as desired. In addition, the arm 26 of the camera dolly 20 may be raised to change the elevation of the camera 275. The crane 40 itself also provides for a wide range of movements. These movements include panning movements left and right 360+ about the crane pan pivot joint 140; tilt up or down, +/− about 60 degrees from horizontal, about the boom arm center pivot joint 46; linear travel in and out +/−12 inches, along the track section 60; pan left or right 360 degrees +, about the frame pivot joint 160; and tilt up or down in elevation 360+, about the hand grip joints 276.

Turning to FIG. 8, an alternative camera frame embodiment 280 provides all of the movements described above, as well as a roll left or right +/−60 degrees. The other components of the crane 40 are as described above. However, instead of the camera frame 68 having a U-section 270 suspended on the track axle 198, and outer roll housing 284 is attached to the track axle 198. The semicircular roll tube 286 extends from a left roll tube end bearing 288 at the left hand grip 274, through curved linear bearings 292 within the outer roll housing 284, and to a right side roll tube end bearing 288 at the right hand grip 274. A roll tube extension bar 285 is attached to the roll tube 286. Extension bar riser plates 284 are attached to the hand grip joints 276 and to the extension plate 285.

As shown in FIG. 9, a side plate 290 is connected to the hand grip joints 276 and to the base plate 272, and is dimensioned to place the center of gravity of the camera 275 on line H—H.

The roll embodiment 280 shown in FIG. 8 operates in the same way as the embodiment of FIGS. 1–3, except that the camera platform 272 can also roll left or right. Preferably, the center of gravity of the camera 275 is also positioned on the center line 3 of the frame pivot joint 160, so that the torque required to roll the camera remains constant throughout the roll movement. A drag adjuster 180 may also be provided on the outer roll housing 284, to adjust the drag of the roll movement. The center of gravity of the camera 275 and plate 272 are preferably set so that the radius RR from the center of gravity to the roll tube 286 does not change with roll movement. Consequently, the torque needed for roll movement remains constant regardless of the position of the camera and platform.

In most applications, the camera frame 68 or 280 will be suspended below the track section 60 on the track axle 198. However, for added lens height, the camera frame 68 or 280 may be unbolted from the bottom of the track axle, turned upside down, and then bolted on to a riser hub 202, as shown in FIGS. 3B and 8, so that the entire camera frame 68 or 280 is now above the track section 60. The camera 275 may remain attached to the top surface 281 of the base plate 272, so that the camera becomes upside down. The camera may then be righted by rotating the handles 274 to pivot the camera platform 272. The camera 275 is then positioned right side up, above the track section 60.

Referring to FIG. 2, the arms 271 and 273 of the U-section 270 are subject to low amplitude vibrations in the side to side, or left/right direction. To provide a more stable support for the camera 275, a vibration isolator 400, as shown in FIGS. 10 and 11, may be used with the U-section 270. The vibration isolator 400 includes a camera mounting plate 402 within a frame 404. The camera mounting plate 402 is moveable only in the side to side (left/right) direction. The camera mounting plate 402 is supported within the frame 404 via linear bearings 405 formed by ball bearings 418 within a semi-circular frame groove 414 in the frame 404, and a semi-circular plate groove 412 in the opposite edges of the plate 402. Ball springs 416 at the ends of the braces keep the ball bearings 418 centered. Return springs 408 are held within spring bores 410 in the lateral sides of the frame 404 and plate 402. Open cell polyurethane foam 106 is provided in the lateral spaces between the plate 402 and frame 404. Mounting holes 420 are provided in the plate 402, for mounting a camera onto a plate 402. As shown in FIG. 11, the camera mounting plate 402 is spaced slightly (e.g., 0.06 inches) the top surface 281 of the base plate 272. This provides clearance underneath the plate 402, for camera mounting hardware, and also suspends the plate 402 above the surface 281, so that it is free to move in the lateral direction L. The vibration isolator 400 has a low profile, with dimension T in FIG. 11 about 0.44 inches.

In use, the frame 404 is attached to the base plate 272. The camera 275 is attached to the camera mounting plate 402 via the mounting holes 420. The front edge F of the isolator 400 is oriented parallel to line H—H (in FIG. 3A).

Consequently, the plate 402 can move laterally, in the direction L, to dampen vibration of the arms 271 and 273 of the U-section 270. When a shock impulse or vibration occurs on the U-section 270, the base plate 272 and frame 404 of the vibration isolator 400 will move with the vibration or impulse. However, the camera 275 and mounting plate 402 are largely isolated from the frame 404 by the suspension of the plate 402 within the frame. Consequently, the camera 275 and plate 402 remain substantially still, via inertia, as the frame 404 moves under shock impulses or vibration. Specifically, if, under an impulse or vibration, the frame 404 moves to the right side, the mounting plate 402 remains substantially in the same position. The foam 406 on the left side compresses dampening the movement. The linear bearings 405 minimize friction between the frame 404 and the mounting plate 402, so that the plate 402 can move freely left and right within the frame 404, compressing the foam 406, as necessary, to silently dampen shock and vibration. The foam 406, when compressed, provides little return force. Accordingly, the return springs 408 are provided to return the frame 404 and mounting plate 402 to relatively centered positions, after the shock impulse or vibration has passed.

As shown in FIGS. 3B and 12–14, in an alternative design, a track section 500 may be removable from the track section arms 62. Specifically, in the removable design, track tubes 502 are used, similar to the track tubes 162, but with the back ends of the track tubes 502 having slots 504. Preferably, a single clamping bolt 506 extends through each of the track section arms 62 (as shown in FIG. 3B). The clamping bolts 506 pass into the slots 504 in the track tubes as the track tubes 502 are installed into the track section arms. The track tubes 502 are fully installed when the end of the slot 504 bottoms out against the clamping bolt 506. The clamping bolts 506 are then tightened, securely attaching the track section 500 onto the track section arms, and hence to the boom arm 44.

The track section 500 may be removed by loosening the clamping bolts 506 and pulling the track sections out of the track section arms.

With the track section 500 removed, the crane 40 is significantly shorter. This allows the crane to be more easily handled and shipped. The track section 500 may optionally be crated and shipped apart from the rest of the crane. As a result, the maximum dimension of the crane 40, for shipping purposes, is greatly reduced. The shipping weight may then also be divided between the track section (optionally including the camera frame 68) and the rest of the crane 40.

The track section may be more permanently attached to the boom arm 44 in the design shown in FIGS. 1–6, using the track section 60, or it may be removable, using the track section 500 shown in FIG. 13. With the track section removable, other accessories may be attached to the boom arm 44 in place of either track section 60 or 500. For example, a short camera platform or plate 530, as shown in FIG. 17, may be attached to the boom arm 44, via square tube stubs 532 inserted into the square openings 174 in the track section arms 62. Similar accessories, such as risers, drop down fixtures, swing heads, etc. may alternatively be attached and removed from the boom arm 44, in the same way that the track section 500 is attached and removed. For some applications, the versatile movements provided by the track section 60 or 500 are not needed. For these applications, the track section can be temporarily replaced with one of the smaller and lighter accessories described above, providing a more compact and lightweight crane. Due to the 2:1 ratio of the front and rear sections of the boom arm, every kilogram removed from payload (which here includes the track section or other accessory, as well as the camera and camera frame ), reduces the counterweight load by two kilograms. Consequently, every one kilogram reduction in payload reduces the total crane weight by 3 kilograms. Hence, in some applications, replacing the track section 60 or 500, along with the camera frame 68 or 280 supported on the track section, can significantly reduce the total weight of the crane.

Referring still to FIGS. 12–14, a mounting block 520 is advantageously provided to allow the track section 500 (along with the camera frame 68 supported on the track section 500) to be attached to other types of camera cranes or dollies. The mounting block 520 has tube openings 522 adapted to receive the slotted back ends of the track tubes 502, similar to the openings in the track section arms 62. The mounting block 520 also has clamping bolts 526 for securely attaching the track tubes 502 to the mounting block 520, in the same way that the track tubes 502 are attached to the track section arms, as described above. With the track tubes attached to the mounting block 520, back ends of the track tubes are held in alignment.

The mounting block 520 is therefore preferably attached to the track tubes 502, during shipping, to hold the track tubes 502 in place. The mounting block can also be used to attach the track section to other types of cranes or dollies. A mounting hole 524 in the mounting block 520 allows a mounting bolt to extend through the mounting block, to attach the mounting block 520 and the track section 500 onto a platform or surface of another crane, such as the cranes described in U.S. Pat. Nos. 5,318,313; 5,312,121; or 5,781, 814, incorporated herein by reference.

Turning now to FIGS. 15 and 16, an accessory 600 for providing roll movement (also referred to as dutch or dutching) is attachable to the back surface 606 (or the front surface 608) of the base plate 272. The roll movement accessory 600 has a base plate bracket 602 preferably joined to the back surface 606 of the base plate 272 via bolts 604. An end plate 610 extends vertically upwardly from the base plate bracket 602 and supports a hand grip joint or motion control device 276 having the construction and operation as described above. A hand grip 274 extends back from the hand grip joint 276. A roll end plate 622 is attached to the hand grip joint 276. A roll platform 620 extends forward (or away) from the handgrip joint 276. The camera 275 is mounted on the roll platform.

As described above with reference to FIGS. 1–6, the base plate 272 can be moved in many ways. However, it cannot roll. FIG. 8 shows an embodiment which can add a limited roll movement. The accessory 600 shown in FIGS. 15 and 16, when attached to the base plate shown in FIGS. 1–6, also provides roll movement. However, it is more compact, simpler, and more versatile than the roll embodiment in FIG. 8.

In use, the roll accessory 600 is bolted onto the base plate 272, and may be installed only when roll camera movement is needed. The camera 275 is then attached to the roll platform 620. The hand grip 274 is preferably behind the camera 275 and roll platform 620, as shown in FIG. 16. The hand grip 274 and hand grip joint or motion control device 276 are then operated as described above with reference to FIGS. 1–6. The roll platform 620 carrying the camera 275 is rolled to the desired angle. The hand grip joint 276 is tightened down to the desired amount of drag. The center of gravity of the camera 275, the roll platform 620, and the roll end plate 622 is preferably set up so that the entire payload is balanced about the roll axis L-6 in FIG. 16. If balanced, then even with zero drag force applied by the hand grip joint 276, the camera will remain in whatever roll position it is placed into. Minor imbalances may also not be noticeable due to residual drag or friction in the joints. The camera lens 277 may also preferably be positioned co-linear with the roll axis L—L, so that the recorded image appears to revolve a stationary center point as the roll angle of the camera changes with pivoting or rotating movement of the roll platform 620.

With smaller cameras, the accessory 600 can provide a continuous 360°+ roll movement. With larger cameras, the roll movement may be limited due to the camera or film magazine contacting the arms 271 or 273 of the U-frame section 270. However, in most filming situations, roll movementst beyond 15–30° from vertical are not needed.

Figure 18:
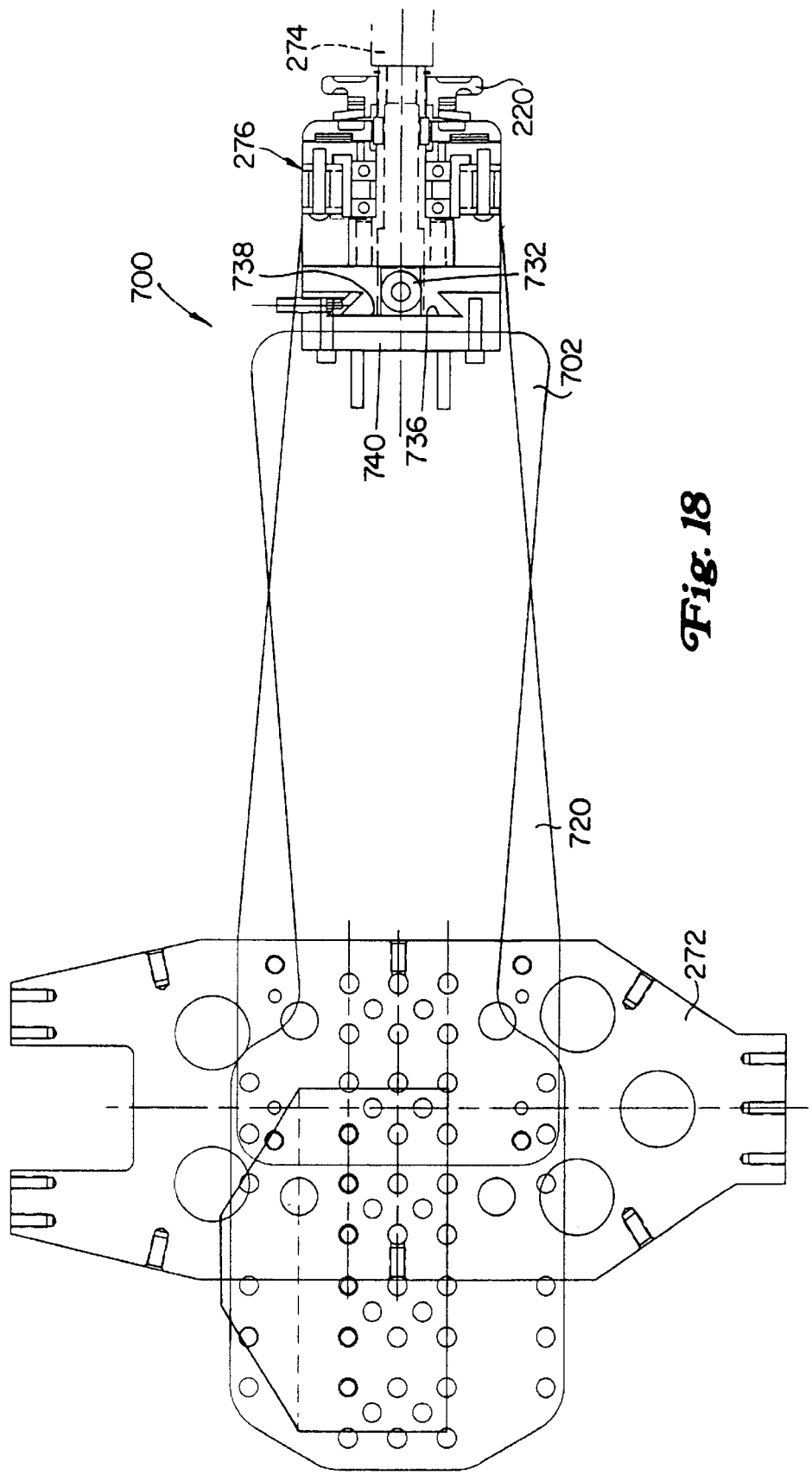
FIG. 18 is a top view of an alternative accessory for providing roll movement.
Figure 19:
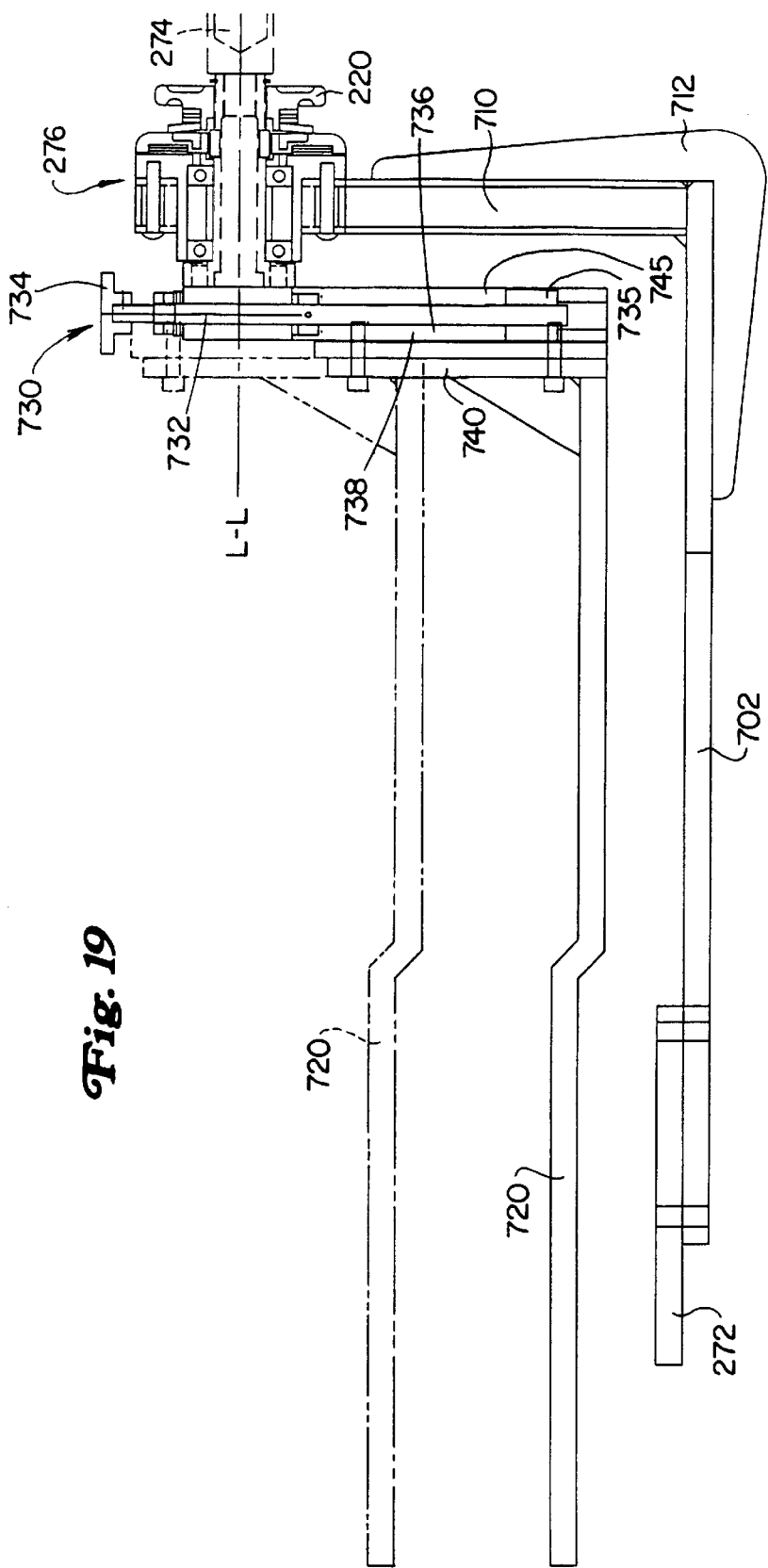
FIG. 19 is a side view of the accessory shown in FIG. 18.
Figure 20:
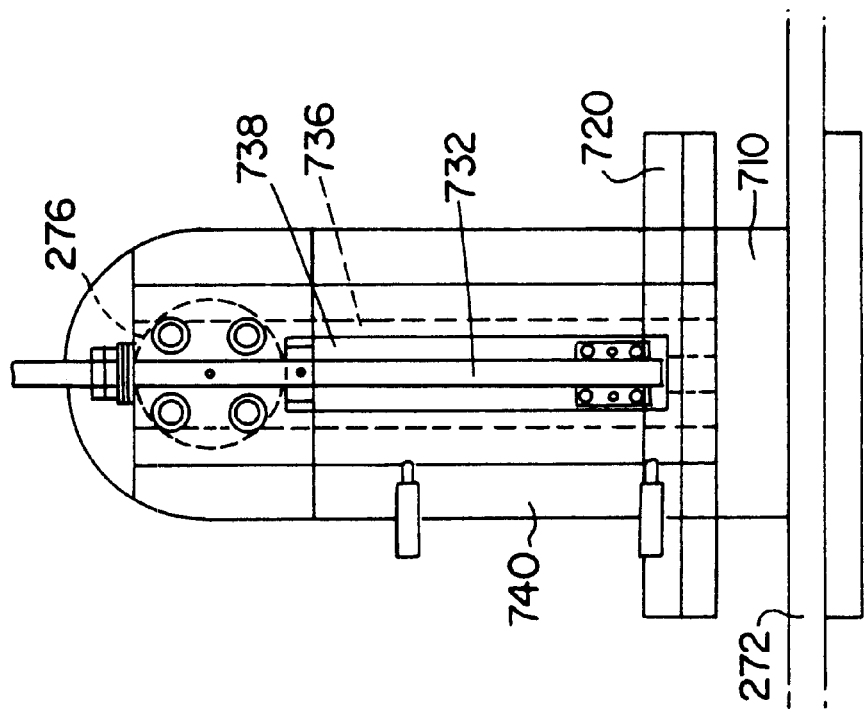
FIG. 20 is a front end view of the accessory shown in FIG. 18.

Referring now to FIGS. 18–20, an alternative accessory 700 for providing roll movement is similar to the accessory 600 shown in FIGS. 15 and 16 but further includes a vertical camera platform elevator, to expedite positioning and balancing of a camera on the camera platform.

As shown in FIGS. 18–20, the roll movement accessory 700 includes a base plate bracket 702 attached e.g., bolted, onto the base plate 272. An end plate 710 is joined at right angles to the base plate 702, supported by a gusset 712. A roll platform 720 is attached to a moveable or front elevator plate 740. A fixed or back elevator plate 745 is attached to the shaft extending through the hand grip joint 276. A dove tail tongue 738 on the back elevator plate 745 extends into a dove tail groove 736 on the front elevator plate 740. An elevator bolt 732 is rotatably supported on the back elevator plate 745 and has a shaft threaded through an elevator nut 735 fixed onto the front elevator plate 740. A hand knob 734 is attached to the top of the elevator bolt 732. The elevator knob 734, bolt 732, plates 740 and 745, and nut 735 form an elevator 730.

In use, the accessory 700 operates in the same way as the accessory 600 described above. However, the vertical position of the roll platform 720 can be adjusted by turning the elevator knob 734. As the knob 734 is turned, the nut 735 is pulled upwardly, or pushed downwardly, by the engagement of the threads on the shaft of the elevator bolt 732 and the threads of the nut 735. The dove tail groove 736 and tongue 738 allow the roll platform 720 and front elevator plate 740 to slide smoothly up and down on the rear elevator plate 745, with little or no play or vibration. Consequently, the roll platform 720 which supports the camera is securely attached to the base plate 272, but can be shifted vertically relative to the base plate 272. This simplifies positioning the vertical center of gravity of the camera (and pivoting support structure including the roll platform 720 and front plate 740) on the roll axis L—L, so that roll movement may be obtained with minimal torque, and little or no braking force is required to hold the camera at any selected roll angle.

Specifically, with the camera positioned on the roll platform 720, the elevator knob 734 is turned to raise the roll platform 720, as shown in dotted line in FIG. 19. This lifting movement is continued until the center of gravity of the pivoting pay load (camera and pivoting components of the accessory 700) is aligned on the axis L—L. At this position, the camera can be placed into any roll angle and released, with little or no further gravity induced movement, i.e., the camera is neither top heavy or bottom heavy. The elevator 730 expedites camera positioning, as shims and spacers are not needed because all vertical adjustments can be performed precisely by the elevator 730. The elevator bolt 732 has sufficient friction or drag in the elevator nut 735 to prevent any inadvertent movement.

Figure 21:
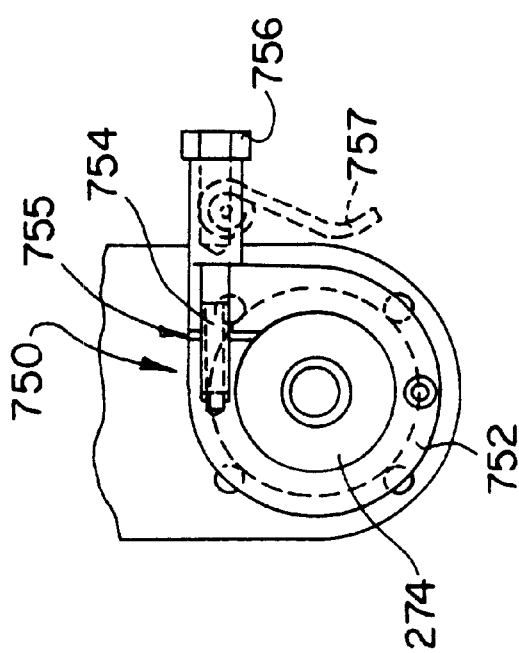
FIG. 21 is a side view of brake for use with and of the joints shown in FIGS. 1–20.

Referring now to FIG. 21, a clamp brake 750 may be used on any of the joints described above, to rapidly provide a large braking force, without changing the joint friction otherwise provided by adjustment of the joint knobs 220 on any of the joints described. The clamp brake 750 includes a split ring collar 752 attached to the non-moving structure around the joint, for example, the frame 270 around the joint 276, as shown in FIG. 3A. A clamp screw 754 having a clamp knob 756 or cam lever 757 extends between the split or gap 755 in the collar 752. Ordinarily, the clamp knob 756 is loosened, so that no braking force is applied to the joint. For situations where rapid and secure braking is desired, to prevent pivotal movement at the joint, the clamp knob 756 is turned inwardly e.g., clockwise or the cam lever 757 actuated vertically. This turning movement pulls the sides of the collar 752 together, clamping them around the shaft 278, or other shaft extending through the joint. Consequently, the shaft 278 is clamped in place quickly and securely. When pivoting movement is again desired, the knob 756 or cam 757 is loosened, with the clamp brake 750 then providing little or no drag to pivoting movement. As the clamp brake 750 operates independently of the joints, such as the hand grip joint 276, when the clamp brake 750 is released, virtually all of the friction or drag on pivoting movement at the joint is determined by the joint itself, i.e., by the position of the hand knob 220 of the joint, and not by the clamp brake 750.

Figure 22:
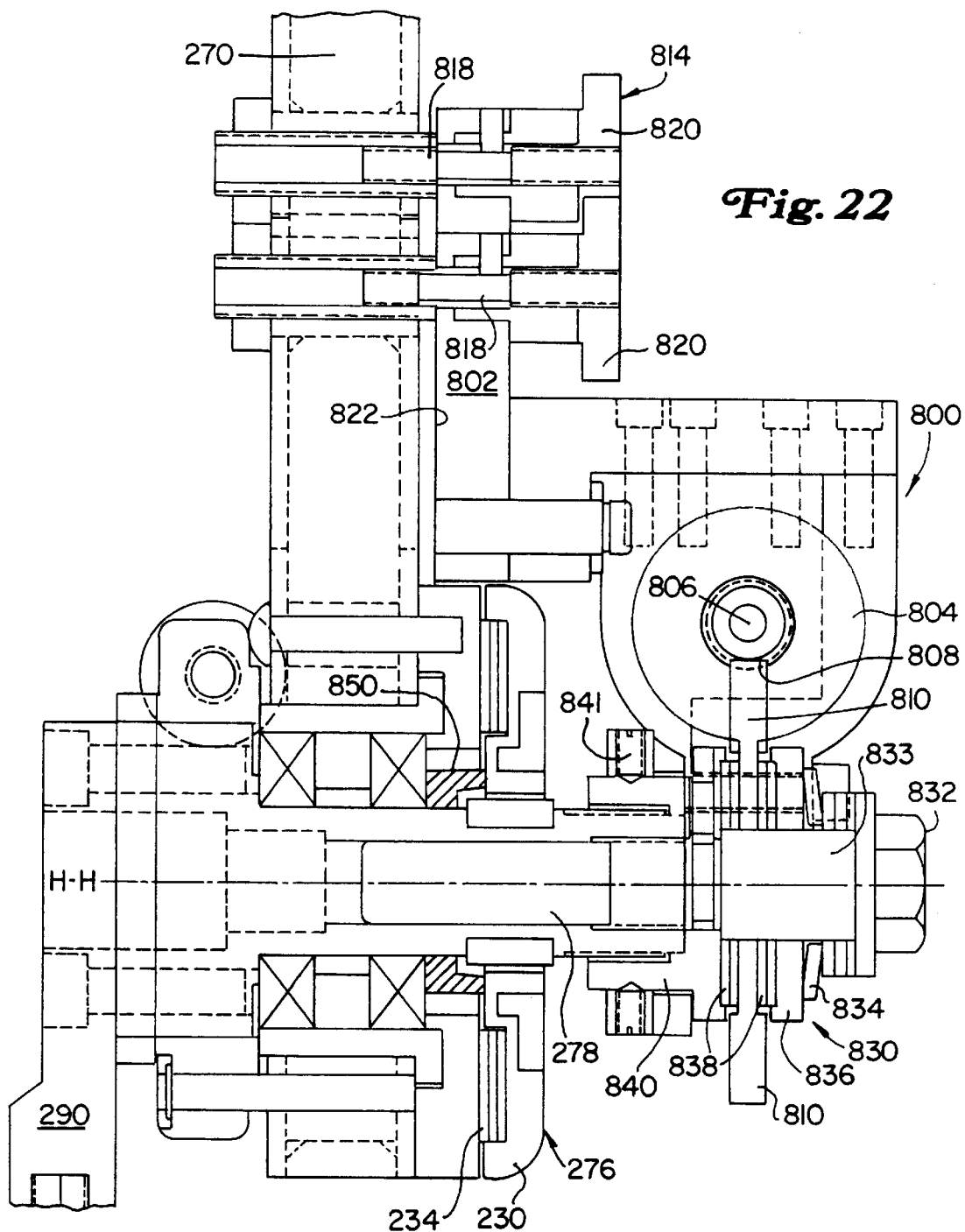
FIG. 22 is a front section view of a remote control camera platform drive accessory; with the cover removed.
Figure 23:
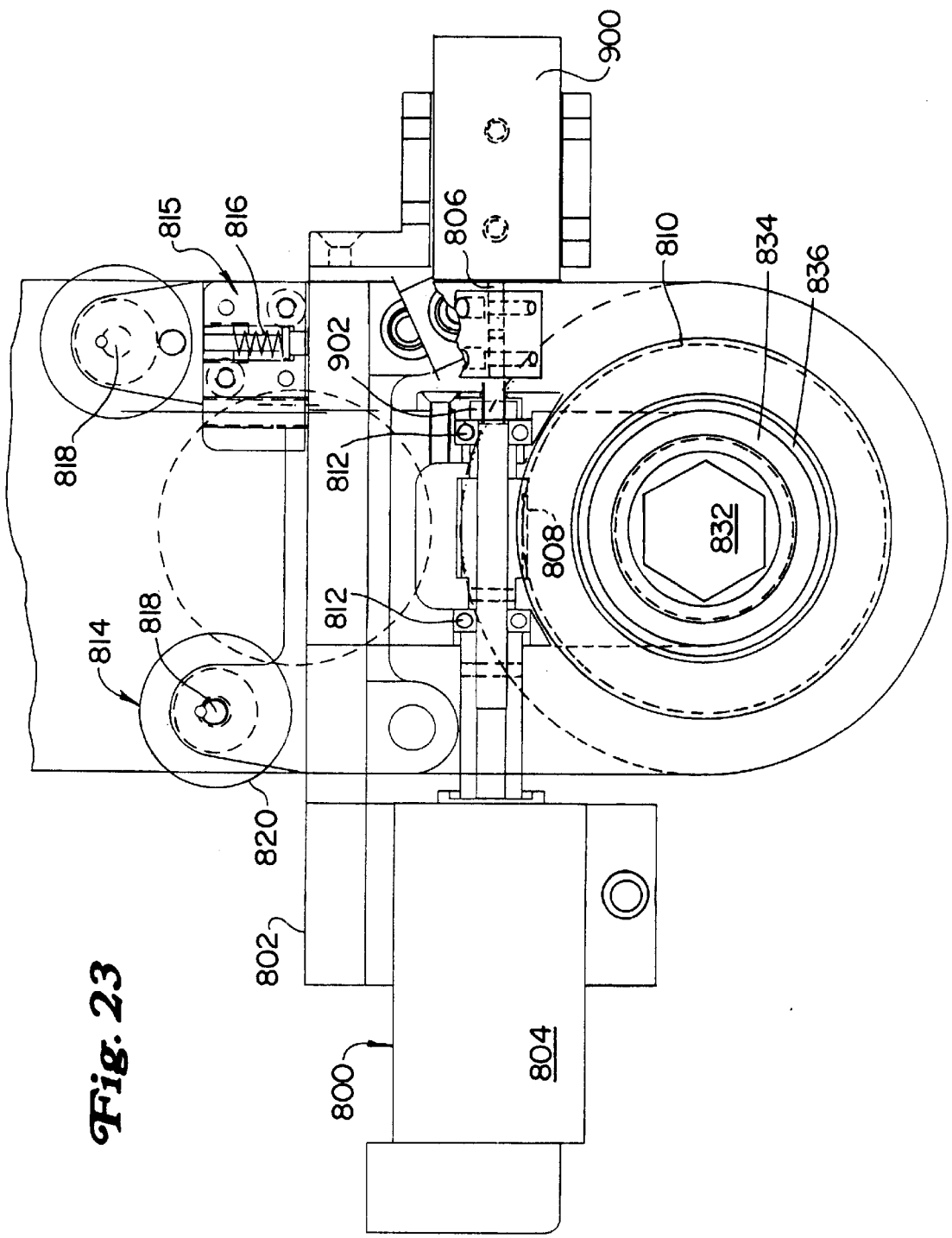
FIG. 23 is a side view of the accessory shown in FIG. 22.
Figure 24:
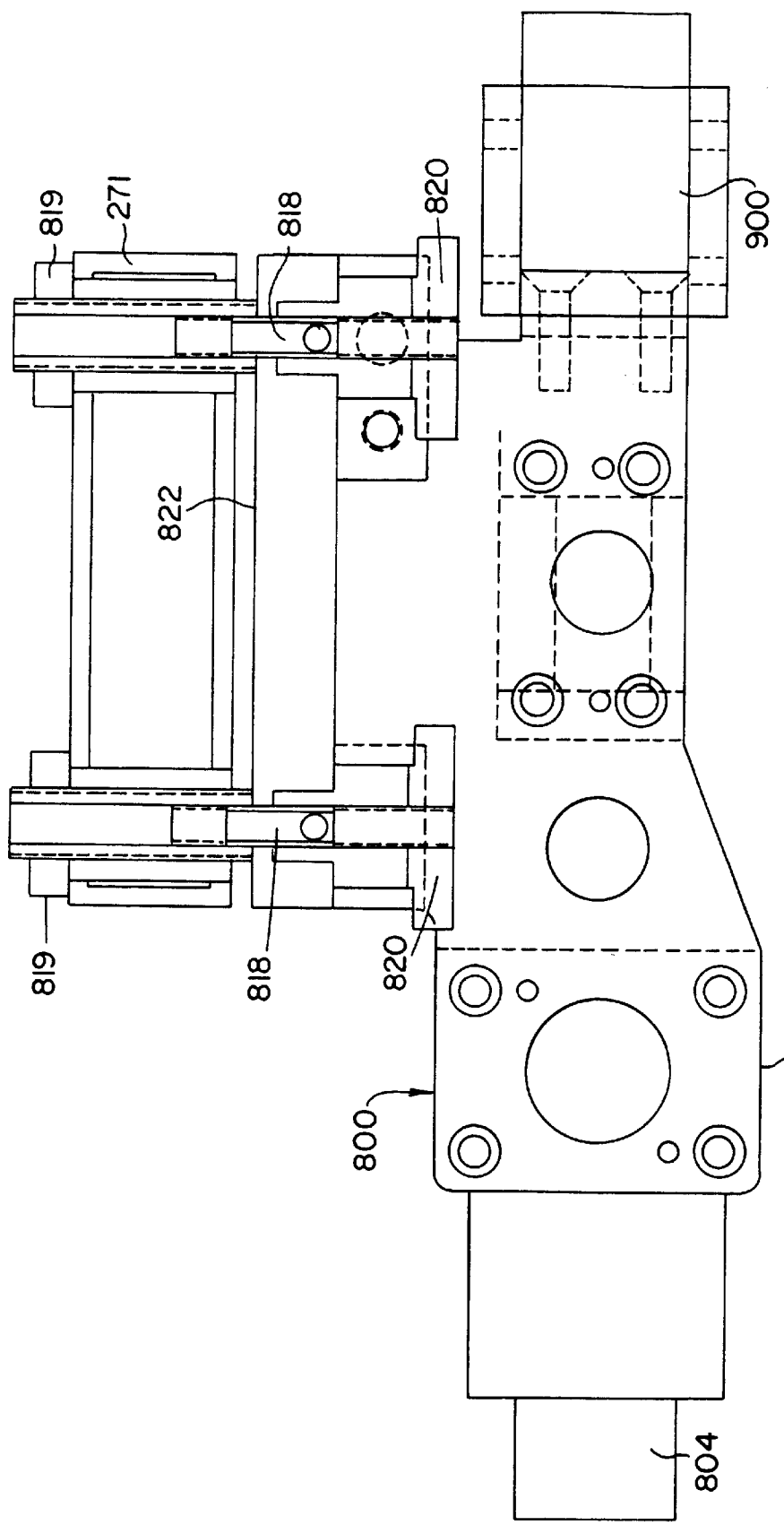
FIG. 24 is a top view of the accessory shown in FIG. 22.

For certain applications, it is advantageous to be able to remotely move and position the camera 275. For example, it may be necessary to position the camera at a high elevation or other position inaccessible to the camera operator. FIGS. 22–24 show a remote drive system 800 for moving and positioning the camera 275. While the drive unit 800 is shown installed at the joint 276, to change the elevation angle of the camera lens 277, the drive system 800 may also be installed at other joints shown and described above, to provide panning movement and rolling movement.

As shown in FIG. 22–24, the drive system 800 includes a baseplate 802 which can be attached to structure around a pivot joint, such as the frame 270 around the joint 276. The housing includes a motor 804 having a drive shaft 806. A worm 808 on the drive shaft 806 engages a worm gear 810 connected to the base plate 272 by the shaft 278. The worm 808 and worm gear 810 preferably have a gear-ratio of 30:1 to 70:1 or 40:1 to 60:1, or about 50:1. The worm 808 together with the worm gear 810 preferably provide a self locking gear system, i.e., the worm 808 can drive the worm gear 810, but the worm gear 810 cannot appreciably back drive the worm 808 coefficient of friction. The worm/worm gear design allows no back drive by use of a single thread worm, gear angle, and the coefficient of friction of the materials used. The self-locking gear system prevents over-driving and potentially damaging the motor. The worm is preferably polished steel and the gear is preferably Minlon (nylon), for smooth and quiet operation. Bearings 812 on opposite sides of the worm 808 support the drive shaft 806 within in the housing 802.

Referring to FIG. 22, a clutch assembly 830 includes a tension bolt 832 extending through a spring 834 positioned against an outer plate cap 836. A sleeve 833 on the bolt 832 bottoms out on a receptacle 840, to prevent over tightening. The worm gear 810 is sandwiched between pressure plates 838, the outer plate cap 836 and the housing receptacle 840. Set screws 841 in the receptacle 840 secure a ring holding the plate stack together. A tach/generator 900 is coupled to the shaft 806 to provide added torque at low rpms. A nut 902 preloads the bearings 812, to remove play.

Referring to FIG. 23, the base plate 802 is preferably attached to the frame 270 (or other structure surrounding a pivot joint) on a pivot pin or mount 814 and a spring mount 815. Hand knobs 820 are attached to mounting bolts 818 which extend into the pivot mount 814 and the spring mount 815. The mounting bolts 818 which thread into stand offs or nuts 819 on or in the frame 270 or other fixed structure. The housing 802 preferably has a flat face plate 822 clamped flat against the surrounding structure, to better support the housing 802.

Referring momentarily to FIGS. 35 and 36, a cover 870 is ordinarily attached to the base plate 802 to cover the components of the accessory or motor drive unit 800.

An access opening 837 in the cover 870 allows access to the tension bolt 832. The access opening is covered by a cap 874, except during installation or removal. A sound absorbing or sound deadening material may be used to line the interior of the cover 870, to further reduce any noise from the unit 800.

Figure 37:
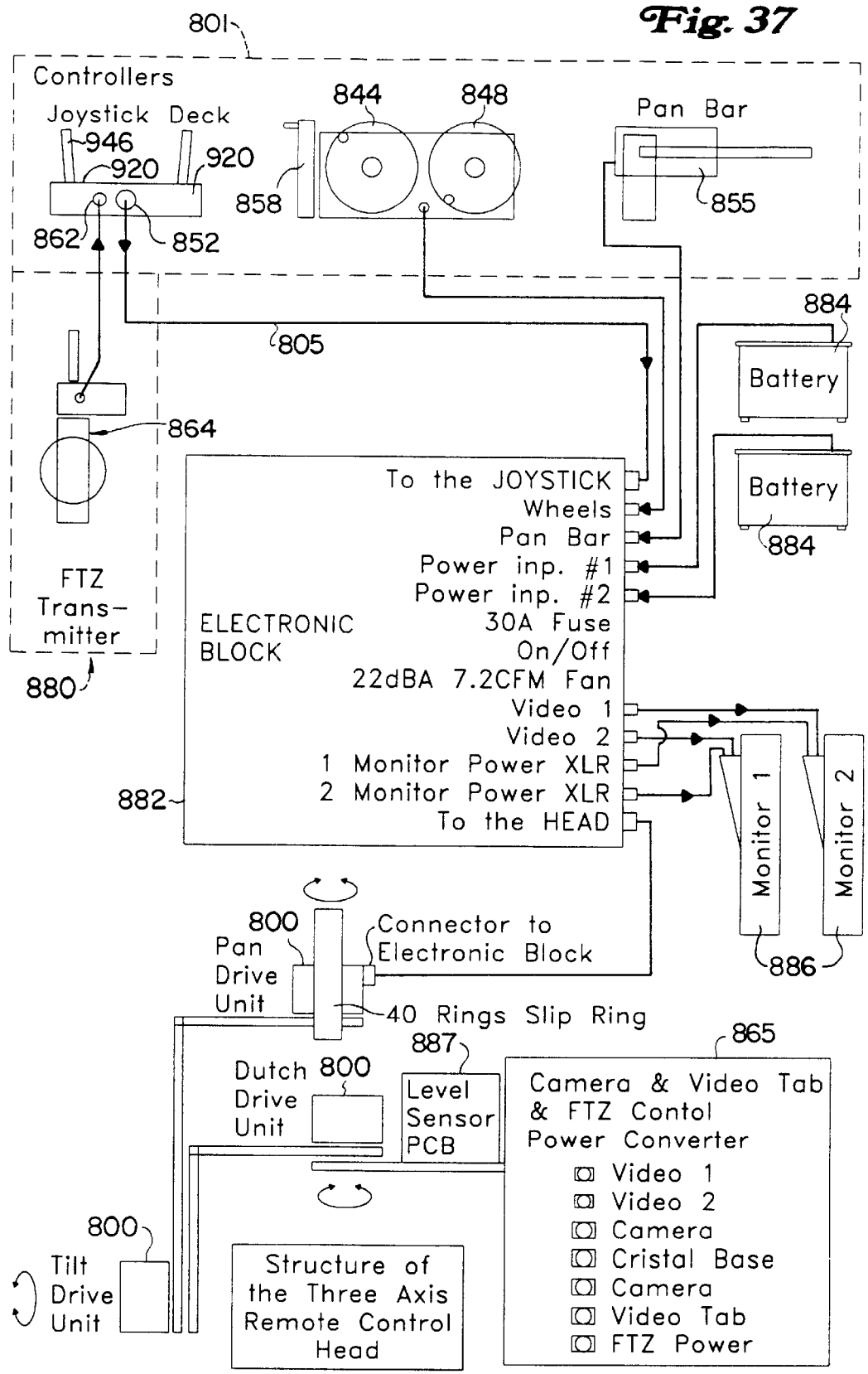
FIG. 37 is a schematic diagram of a camera/camera platform control system.

Referring momentarily to FIGS. 1 and 37, the motor 804 of the remote drive unit(s) 800 is preferably connected to an electronics box 882 which is connected to a remote control box 801 by a cable 805. Alternatively, the control box 801 may be linked to the motor 804 by wireless communications. A power supply to operate the motor 804, such as batteries 884, is also preferably electrically connected to the motor 804 by the cable 805, via the electronics box 882. The power supply or batteries may be mounted on the frame 270, elsewhere on the crane or dolly shown in FIG. 1, or at another location connected to the electronics box by a cable.

In use, when remote control is desired, the drive unit 800 is installed. The embodiment shown in FIGS. 22–24 provides elevation movement. Additional drive accessories 800 can be provided at the frame pivot joint 160, for panning movement as shown in FIGS. 35 and 36, or at the pivot joint on the roll accessory 600 or 700, to provide remote roll movement. FIG. 37 shows one unit 800 used for each axis. The unit 800 can be used on any axis or joint.

To install the drive unit 800 at the joint 276, the hand grip 274 at one side is removed (screwed out of) the hub 278. Referring to FIGS. 2, 3A and 22, the unit 800 is then installed by placing the housing receptacle 840 over the hub 278, removing the cap 874, threading the tension bolt 832 into the hub 278, and replacing the cap 874. Using the hand knobs 820, the mounting bolts 818 are threaded into the nuts 819 shown on FIG. 22, to clamp the face plate 822 of the baseplate 802 against the frame 270. The spring 816 pushes or pivots the baseplate 802 down and clockwise in FIG. 23, causing the worm 808 to engage the worm gear 810. This design eliminates all or virtually all backlash. The tension bolt 832 is tightened to a desired preselected tension. Alternatively, the tension bolt can be tightened all the way in until the sleeve 833 bottoms out, thereby automatically setting a desired preset tension (based on the length of the sleeve).

Using a hand control on the control box 801, electrical control signals are provided to the motor 804, to move the base plate 272 to any angle of elevation. The motor 804 turns the shaft 806 and worm 808. The worm 808 drives the worm gear 810, which is connected to the hub 278 and the base plate 272 supporting the camera 275 via the clutch. Consequently, the motor 804 allows the camera elevation angle to be changed remotely. The clutch allows only the maximum desired torque to be applied, to protect the motor from over torquing. It also allows instant manual control by moving the camera platform directly with hand force. Conversely, if the camera platform is inadvertently locked in place, e.g., against a wall, doorway, etc., and the motor 804 is energized, the motor and worm gear can turn, without moving the camera platform, via slipping the clutch.

As the tension bolt 832 is tightened, the spring 834 exerts increasing pressure on the pressure plates 838, which clamp the shaft gear 810 between them. A wing nut or lever may be used instead of the tension bolt 832, to allow installation without tools. Ordinarily, the tension bolt 832, spring 834, plate cap 836, pressure plates 838 all turn with the shaft gear 810 and the hub 278. However, to avoid overloading the shaft gear 810, if torque is excessive, the shaft gear 810 will slip between the pressure plate 838. If the camera or base plate are accidentally bumped or pushed, the base plate and hub 278 can then rotate, while the shaft gear 810 remains stationary. This avoids overloading the worm gear 810, the worm 808, or reverse driving the motor 804. The clutch assembly 830 is preferably set to hold up to 50–100, and preferably 65–85 or 75 inch pounds of torque. At these settings, e.g., 75 inch pounds, the base plate and camera can be quickly positioned by hand, using nominal force (e.g., 4–6 or 5 pounds) at e.g., 10–12 inches from the pivot axis H—H, thereby overriding the clutch assembly 830. In this way, quick adjustments can be made by hand, when the base plate 272 and camera 275 are accessible or reachable, without removing or disturbing the accessory 800, while remote control can be used via the motor 804, when needed.

Similar installations and operation may be made by providing additional accessories 800 at the other joints. No gear reducer is required, yet appropriate gear ratios are obtained.

The hand control on the control box 801 is preferably a joystick or handwheel. In many existing joystick controllers, the stick is mechanically linked to a potentiometer or variable resistor. To adjust the sensitivity of the controller, gears or other mechanical linkages have been provided between the stick and the potentiometer. This better allows the ergonomics of the operator's hand/stick movement to provide the desired control output signal. However, the need for smooth hand control of a joystick controller, by reducing the sensitivity of stick movements, may conflict with the ability of the joystick controller to. provide a wide range of control signals. For example, many joystick controllers use potentiometers which can be varied from a minimum to a maximum electrical resistance with a turning movement of up to about 150–180°. While some potentiometers can be varied from a minimum to a maximum resistance over a broader turning range of movement (some even exceeding 360° of movement), these potentiometers typically require internal gearing or other complicating design factors, which may increase the cost and reduce the precision control of the potentiometer.

Due to ergonomic factors, stick movement in joystick controllers is typically limited to ±45° from center, and perhaps up to even ±60° from center. Stick movement beyond these limits becomes difficult or impossible to provide, due to the mechanical design of the joystick controller, and to the ergonomic disadvantages in achieving precise hand/stick movement, as the stick approaches a horizontal position. Accordingly, design challenges remain in providing a precision control joystick where the stick moves within a nominal range of ±45°, 50°, 55° or 60° while at the same time, potentiometer movement of e.g. 150°, 165° or even 180° is achieved (without movement multiplying devices within the potentiometer) and while maintaining a sensitivity level facilitating precision hand/stick control. More generally, design challenges remain in providing precision control with a joystick, regardless of the ranges of operation.

The joystick shown in FIGS. 25–30 provides precision control of camera movement on tow axes, over a wide range of angles. A second joystick is preferably added to the control box for control on a third axis as well, as shown in FIGS. 33 and 37.

As shown in FIG. 25, a precision control joystick unit 920 includes a second housing or plate 922, and a first housing or plate 930 pivotably attached to the second housing 922. Ordinarily, the second housing 922 is fixed in place, e.g., attached to a control panel, etc., on the control box 801 with the first housing 930 able to pivot relative to the second housing 922. The second housing 922 includes a top plate 924 having a stick opening 928. A side plate 926 is attached to the top plate 924, preferably with screw fasteners.

The ends of a shaft 940 are supported on the top plate 924 by an outer bearing 936 and an inner bearing 938. The bearings 936 and 938 are pressed into or otherwise held in place within an outer bearing block 932 and an inner bearing block 934, respectively. The first housing 930 is preferably fixed or attached onto the ends of the shaft 940 by set screws or other attachment.

A slot 942 extends through the shaft 940. A stick 946 extends through the slot 942 and is pivotably attached to the shaft 940 with a shaft pin 944. A cap 948 is attached onto the upper end of the stick 946.

Referring still to FIG. 25, a cam roller 960 is rotatably supported on the lower end of the stick 946, on a roller axle or pin 962. The lower ends of an outer or first cylinder 974, and an inner or second cylinder 976, are pivotably attached to the second housing 930 at pivot mounts 984. A shaft extending out of the first cylinder 974 and the second cylinder 976 is attached to (preferably threaded into) an outer or first clevis 970 and an inner or second clevis 972, respectively. Each clevis 970 and 972 has a clevis slot 982. Clearance slots 950 are cut into the bottom surface of the shaft 940, to provide clearance for the clevis 970 and 972.

An anti-backlash cam gear 978 is attached to a cam 964. Cam gear pins 980 extend from the side of the gear 978, through the clevis slots 982 in the clevis 970 and 972, and into the cam 964. A cam surface 992 is formed on the cam 964, between the cam arms 990 attached to the gear 978 by the pins 980. As shown in FIGS. 29 and 30, the cam 964 includes a bearing shaft section 996 and a gear shaft section 998. The bearing shaft section 996 is supported on a bearing within the second housing 930, to fix the gear center of the gear 978, which is mounted on the gear shaft section 998.

Referring back momentarily to FIG. 25, a converter, for converting mechanical movement into a corresponding electrical signal (or electrical signal function) such as a potentiometer 1000, includes a converter gear 1020 mounted on a shaft 1030, with turning movement of the shaft 1030 varying the resistance or other output. A split ring clamp or housing 1040 attached around the converter 1000 has a clamp tab 1060 precisely movable by advancing a first set screw 1100, while backing out a second opposing set screw 1120.

Referring to FIG. 28, a housing extension 1200 is attached to, and pivots with the first or pivoting housing 930, for example, by attaching the housing extension 1200 to the inner end of the shaft 940 with a set screw 1220, or other attachment technique.

Figure 27:
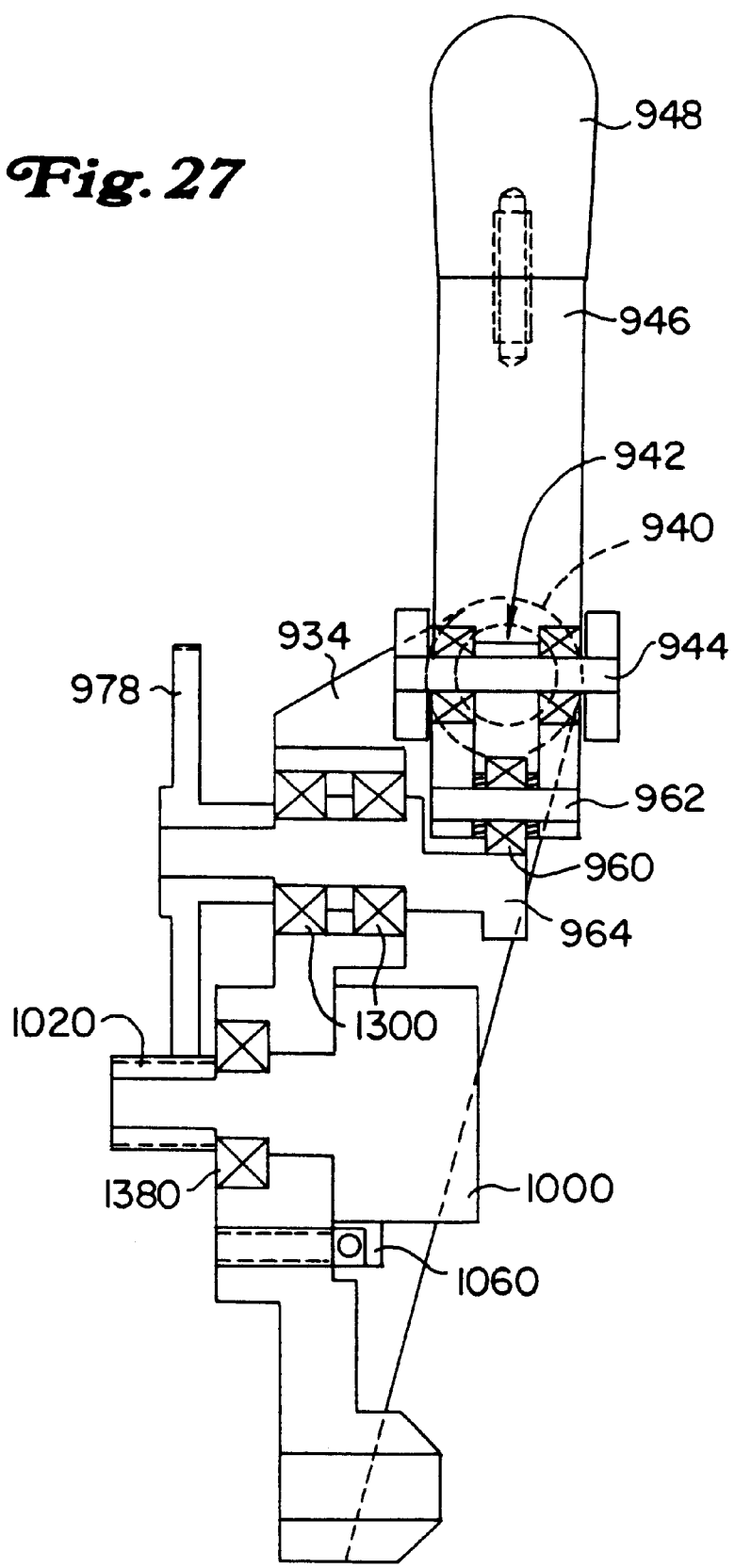
FIG. 27 is a partial section view taken along line 27—27 of FIG. 25, and with certain components omitted for clarity of illustration.

Referring to FIGS. 25 and 27, a second cam 1260 is pivotably or rotatably supported within the side plate 926 or other structure of the first housing 922 on bearings 1300. A second anti-backlash gear 1320 is attached to the gear shaft section of the second cam 1260. A second converter or potentiometer 1340 is supported on the side plate 926 or other structure of the first housing 922 on a bearing 1380. A second potentiometer gear 1360 on the shaft 1350 of the second converter 1340 engages or meshes with the second gear 1320. A split ring clamp 1040 and set screws 1100 and 1120 are provided on the second converter 1340, as described above with respect to the first converter 1000. Cylinders 1400 and 1420 (not shown in FIG. 25) are attached to the second cam 1260 on a clevis 1440 and 1460 (not shown in FIG. 25), as described above with reference to the first cam 964.

A second cam roller 1240 on the housing extension 1200 rolls on a cam surface 1280 of the second cam 1260, as shown in FIG. 28.

In use, as the stick 946 is moved in the front/back direction (indicated by the arrow F/B in FIG. 28), the stick 946 pivots about the pin or axle 944, and the cam roller 960 rolls on the cam surface 992. Referring to FIG. 28, movement of the cam roller 960 on the cam surface 992 causes the cam 964 and the gear 978 attached to the cam 964, to turn. As this occurs, with the stick pushed forward as shown in FIG. 28, the clevis 970 and shaft of the outer cylinder 974 move down, with the shaft retracting into the body of the cylinder 974. At the same time, the gear 978 drives the converter gear 1020, causing the converter 1000 to provide an electrical output varying as a function of the position of the stick 946.

With side-to-side movement, perpendicular to the direction F/B, the stick 946 cannot pivot relative to the first housing 930. However, as the stick 946 is moved to one side, by the user's hand, the entire second housing 930 pivots relative to the first housing 922, as shown in dotted lines in FIG. 26. As this occurs, the second cam roller 1240 drives the second cam 1260, which turns the second gear 1320. Correspondingly, the shaft 1350 and gear 1360 of the second converter turn. The second converter 1340 then provides an electrical output varying as a function of the side-to-side position of the stick 946 and housing 930, relative to the housing 922.

The cylinders 974, 976, 1400 and 1420, preferably contain a spring and a fluid dampener. The cylinders act to return the cams, gears and stick 946 back to the central or neutral position, shown in FIG. 25, after the stick 946 is released. The clevis 970, 972, 1440 and 1460 is preferably threaded onto the shaft of its associated cylinder, so that the vertical position of the slot 982 in each clevis can be adjusted during manufacture of the control unit 920. The split ring clamp 1040, clamp tab 1060, and set screws 1100 and 1120 are similarly provided with each converter 1000 and 1340, to calibrate the converter, during manufacture or to zero out drift during servicing. To set the converters 1000 and 1340 to a zero position, the output or resistance of each converter is monitored while the set screws 1100 and 1120 are manipulated to turn the converter slightly relative to the shaft 1030 or 1350, until the desired converter output is achieved. Both set screws 1100 and 1120 are then tightened, to lock the converter into the desired position. As even slight relative movements between the converter and its shaft can vary the converter resistance or output, use of the set screws 1100 and 1120 better facilitates calibration.

The ratio between the gears 978 and 1020, and 1320 and 1360, respectively, preferably ranges from 3:1 to 7:1 or 4:1 to 6:1. In the embodiment shown in the drawings, the ratio is 5:1. The gears 978 and 1020, and 1320 and 1360, preferably have anti-backlash features, such as spring biased split gear sections. However, other types of gears or connections can be used.

The converters or potentiometers 1000 and 1340 are preferably connected in series with a speed setting potentiometer (within the control unit 920, or elsewhere in the control system) to select speed control ranges.

The cam surface 992 on both cams 964 and 1260, is preferably circular. However, shapes such as elliptical shown in FIG. 31A, oval as shown in FIG. 31B, flattened oval as shown in FIG. 31C, or segmented oval, as shown in FIG. 31D, as well as other shapes, may also be used. The shape of the cam surface 992, and the size of the cam surface 992 affect the sensitivity of the control unit 920. The larger the radius R in FIG. 30, or other characteristic dimension of a non-circular cam surface, the less sensitive the control unit will be, i.e., more stick movement will be needed to achieve a given converter output. Similarly, the flatter the cam surface, the more slowly stick movement will affect converter output.

The cam rollers 960 and 1240 are preferably bearings which roll on the cam surface 992. However, a bushing or sliding element may also be used.

The sensitivity of the control unit 920 may also be adjusted by varying the gear ratios. For use with standard and commercially available potentiometers 1000 and 1340 (having a 150° range of shaft movement) to be able to achieve a full range or potentiometer settings or positions, the minimum gear ratios are preferably 3:1 or 4:1.

The cam rollers 960 and 1240 are preferably, but not necessarily, contacting the cam surface 992, at all times. The cam surface 992 may be configured so that at the zero or center position, or at other positions at or near the end limit of travel, a small gap remains between the cam rollers and cam surface.

As the stick 946 is manipulated, one pin 980 moves down with one side of the cam and the associated clevis, such as the clevis 970 in, FIG. 28, while the other pin 980 in the other clevis (clevis 972 in FIG. 28) moves up within the clevis slot 982. The cylinders 974 and 976 are both shown in their fully extended positions in FIG. 25.

The side-to-side or second axis system provided by the second cam 1260, second gear 1320, second converter 1340 and second cylinders 1400 and 1420 operate in the same way, and with the same design as the F/B or first axis system described above and including the first cam 964, first gear 978, first converter 1000 and cylinders 974 and 976. The cylinders provide an accurate zero position for the gears, when the cylinders are fully extended.

Figure 32:
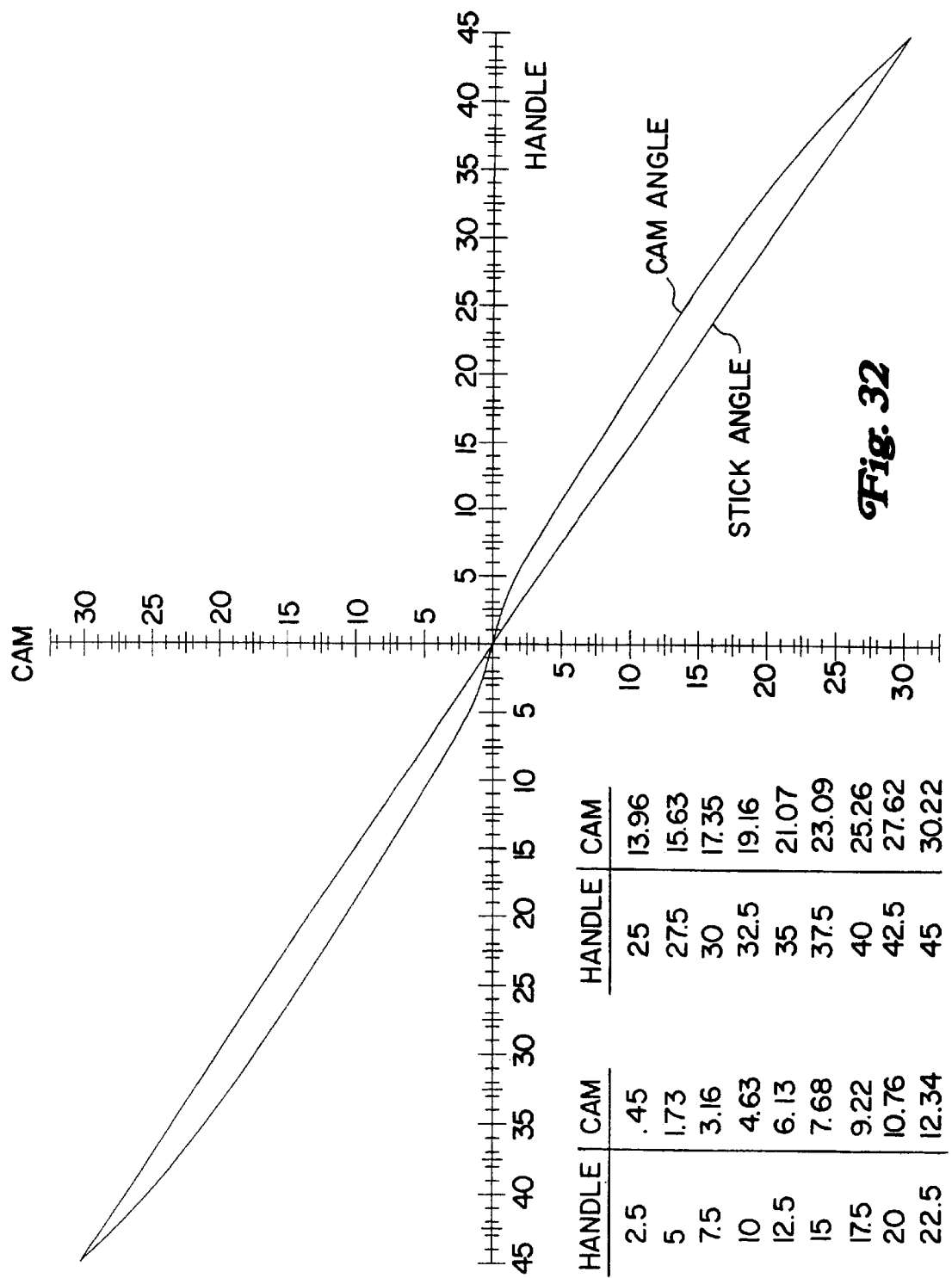
FIG. 32 is a graph of stick v. cam angle movement.

As shown in FIG. 32, the cam surface 992 reduces the amount of gear movement induced by movement of the stick 946, reducing the sensitivity of the control unit 920. As shown in FIG. 32, e.g., 5° of handle movement is reduced to 3–4° of cam movement in the ranges shown.

Two joystick units 920 are preferably included the control box 801, as shown in FIG. 33.

The control box 801, as shown in FIGS. 1, 33 and 37, preferably has a first or left side section 842 and a second or right side section 843, as shown in FIG. 33. The left side section 842 includes a joystick unit 920 set up so that side-to-side movement (in the direction of arrow LR in FIG. 33) controls the dutch or roll movement of the camera 275, with the camera supported on a roll accessory, such as accessory 600 or 700, driven by a drive unit 800. Front/back movement of the joystick unit 920 on the left side 842 is typically set up to control zoom of the lens 277 of the camera 275. A dutch speed range control 844, a dutch trim control 845 and a dutch offset control 846 are preferably also provided on the box 801. Similarly, a zoom speed control 848 is also preferably provided.

On the right side 843 of the control box 801, a second joystick unit 920 is provided. Side-to-side movement of the joystick unit 920 on the right side 843 typically is set up to provide panning movement, with front/back movement controlling tilt or elevation movement. A pan speed control 854, pan trim control 855, tilt speed control 858 and tilt offset control 859 are also preferably included. Each type of movement controlled by the control box 801 also has a reverser switch, i.e., a dutch reverser switch 847, a zoom reverser switch 866, a pan reverser switch 856, and a tilt reverser switch 860. Similarly, a lockout switch is provided for each type of movement, specifically, a dutch lock switch 850, a zoom lock switch 851, a pan lock switch 857, and a tilt lock switch 860. When switched off, the lock switches disable movement. The reverser switches reverse the correspondence between the direction of movement of the joysticks 948 and the direction of movement of the motors in the drive units 800. A camera power on/off switch 853 may also be provided on the control box 801.

The dutch speed control 844 is connected with the output of the converter or potentiometer 1000, to set the dutch speed movement resulting from a given stick position. The other speed controllers, i.e., the zoom speed controller 848, tilt speed controller 858 and pan speed controller 854 are similarly connected with the converters or potentiometers of the joystick units 920, to set the speed ranges and speed controls resulting from movement of the joysticks 946.

Many motion picture or video cameras can be remotely controlled using a Preston system. In the Preston system, motors or actuators at the camera control focus, iris, and zoom. The Preston system 880 includes an RF transmitter 864 and an RF receiver 865, as shown in FIG. 37. Monitors 886 are also provided to allow the camera operator to remotely view the image recorded by the camera, and to remotely view the settings on the camera lens. The control box 801, electronics box 882 and drive units 800 may be combined with a Preston system 880, as shown in FIG. 37, to provide remote control of all camera functions, as well as the camera platform. In this embodiment, a Preston system connector 862 may be provided on the control box 801 to connect with the Preston system 864, to provide power to the, transmitter 864. Similarly, a power lead from the drive unit 800 closest to the receiver 865 may provide power to the receiver. A level sensor 887 is optionally provided on the camera platform 281, to provide an electrical indication of a level position, rather than relying exclusively on a monitor image. If the Preston system is used with the camera platform control system including the control box 801, electronics box 882 and drive units 800, the zoom control function may be performed by the transmitter 864 or by the left side joystick control unit 920 of the control box 801.

In certain filming or video applications, it is advantageous to change the ratio of the boom arm 44. This ratio is determined by the ratio of the distance between the boom arm front pivot joint 64 to the boom arm center pivot joint 46, to the distance between the boom arm center pivot joint 46 and the boom arm rear pivot joint 54. In the boom arm embodiment shown in FIG. 3A, this ratio is 2:1. FIGS. 38 and 39 show an alternative boom arm 1700, which is extended to provide added reach to the camera crane. The boom arm 1700 shown in FIGS. 18 and 19 is the same as the boom arm 44 shown in FIG. 3A, except as follows.

The second front segment 84 of the boom arm 44 is severed, separating the first front segment 82 from the rest of the second front segment 84, with an extension section 1702 installed between the sections 82 and 84, as shown in FIG. 18. The extension section 1702 has the same exterior shape and dimensions as the second front segment 84. Corner pins 1704 extend from the corners of the extension section 1702 into corner bores 1706 in the section 84. Add Similarly, corner pins 1704 extend from the modified first front segment 82 into corner bores 706 in the extension section 1702.

An arm connecting plate 1708 is secured within the front segment 82 via arm plate bolts 1710. The back end of the arm connecting plate 1708 extends outwardly from the segment 82 into the extension section 1702. A pair of extension section locking bolts 1724 extend from the top through the bottom of the extension section 1702. A slot in the front end of the arm connecting plate 1708 is positioned around the extension locking bolts 1724. The arm connecting plate 1708 extends vertically from the bottom inside surface 1709 to the top inside surface 1711 of the section 82, preferably, with a line to line fit. The section 82 is attached and secured to the extension section 1702 by aligning the corner pins 1704 with the corner bores 1706, and then sliding the two sections together. Correspondingly, the slot in the front end of the arm connecting plate 1708 moves into the extension section 1702, around the extension locking bolts 1724. The extension locking bolts 1724 are then tightened, clamping the arm connecting plate 1708 and the section 82 to the extension section 1702. As the arm connecting plate 1708 fits closely within the interior lower and upper surfaces 1709 and 1711 of the extension section 1702, slight compression of the extension section 1702 by the extension locking bolts 1724 securely clamps the extension section 1702 and the front segment 82 together.

The extension section 1702 is similarly attached to the modified second front segment 84. Specifically, an extension connecting plate 1720 is secured within the extension section 1702 by bolts 1722. The extension connecting plate 1720 preferably fits substantially line-to-line with the lower and upper interior walls 1709 and 1711, of both the extension section 1702 and the modified second front segment 84. The back end of the extension connecting plate 1720 extends rearwardly out. of the extension sections 1702 and into the segment 84. Arm locking bolts 1714 extend from the top to the bottom of the segment 84. A slot in the front end of the extension connecting plate 1720 fits around the arm locking bolts 1714.

The extension section 1702 is attached to the segment 84; by aligning the corner pins 1704 on the extension section 1702, with the corner bores 1706 in the segment 84, and sliding the extension section 1702 against the segment 84. Correspondingly, the front end of the extension connecting plate 1720 slides into the segment 84 and around the arm locking bolts 1714. As the bolts 1714 are tightened, the front end of the segment 84 compresses sufficiently to securely lock the extension section 1702 to the segment 84. In practice, the extension section 1702 is preferably attached first to the segment 84, and then the front segment 82 is attached to the extension section 1702, for ease of assembly.

The extension section 1702 is an accessory which may or may not be used. When used, it is installed to extend- the length of the arm, as described above. The extension section 1702 may be stored and shipped separately from the arm 1700, to reduce storage and shipping container size. When the extension section 1702 is not installed or used, the end segment 82 is connected directly to the second front segment 84. In particular, the corner pins 1704 in the end segment 82 are aligned with the corner bores 1706 in the segment 84, and the two segments are brought together. As this occurs, the front end of the arm connecting plate 1708 moves into the interior of the segment 84. The slot and the arm connecting plate 1708 moves around the arm locking bolts 1714. The arm locking bolts 1714 are tightened, to secure the segment 82 onto the segment 84, to provide a boom arm substantially the same as the arm 44 shown in FIG. 3A (but adapted to be extendable via use of the extension section 1702). The extension section 1702 can be of any desired length. Typically, the extension section 1702 is between 0.5–4', more preferably 1 or 2' long.

As use of the extension section 1702 lengthens, the boom arm 1700, in comparison to the boom arm 44, the leveling rods 48 must be lengthened by a corresponding amount. As shown in FIGS. 40 and 41, an extended leveling rod 1730 includes an extension rod 1732 having an extension connection collar 1734. The collar 1734 is preferably permanently attached to the extension rod 1732, via a pin 1736, welding, etc. The leveling rods 48 shown in FIG. 3A are converted to be adaptable for use with an extended arm by severing the front end of the leveling rod 48 just behind the front pivot joint 66. A rod end collar 1744 is preferably permanently installed to the rod end 1742 having the pivot joint 66. The rod end collar 1744 is dimensioned to slide into the extension rod 1732. Similarly, the extension connection collar 1734 is dimensioned to slide into the rear segment of the leveling rod 48. A first quick release locking pin 1740 extends through a locking pin hole 1738 in the extension rod 1732 and the rod end collar 1744. This allows the rod end 1742 to be quickly connected and disconnected from the extension rod 1732. Similarly, a second quick release locking pin 1740 extends through a locking pin hole 1738 in the rear segment of the leveling rod 48 and the extension connection collar 1734. This allows the extension rod 1732 to be quickly and easily attached and removed from the leveling rod 48.

In use, a pair of extension rods 1732 matching the lengths of the extension section 1702 to be used are provided as a kit. The extension rods 1732 are installed to provide extended leveling rods 1730 matching the increased length of the arm 1700 provided by the extension section 1702. The extension rods 1732 are installed by inserting the extension connection collar 1734 into the back segment of the leveling rod 48 and securing them together with the locking pin 1740. The rod end 1742 is then similarly attached into the front end of each extension rod 1732.

When the extension rods 1732 are not used, the rod end 1742 is connected directly into the back segment of the leveling rod 48 by inserting the rod end collar 1744 into the leveling rod 48. The rod end 1742 is secure in-place with a locking pin 1740.

The track section 60 shown in FIGS. 1–3B may advantageously be used in certain applications separate from the boom arm 40. For example, the movement features provided by the track section 60 may be advantageously used by attaching the track section 60 directly to the dolly platform 28 (without using the other components of the crane 40). In this way, the track section 60 may be provided as an accessory for use directly on a camera dolly, such as the dolly 20 shown in FIG. 1, or with other camera dollies or cranes. Referring to FIGS. 42–44, a track section accessory 1800 includes the track section 60 shown in FIGS. 1–3B. The slider plate assembly 170 is not used. Rather, a slide head 1820 is provided on the track section 60. The accessory 1800 is attached to a camera dolly platform, or other support, via a track frame 1802.

Referring momentarily to FIGS. 45–47, the track frame 1802, used to attach the track section 60 to a dolly or crane platform, includes a pair of track tube clamp assemblies 1808 attached to a base plate 1804. A large mounting stud 1806 extends down from the base plate 1804, to secure the base plate 1804 and the track frame 1802 to e.g., a camera platform such as platform 28 shown in FIG. 1. The square track tubes 162 of the track section 60 fit within the track tube clamp assemblies 1808. Each clamp assembly 1808 includes a clamp plate 1814 pivotally attached to a clamping screw 1812. The clamping plate 1814 clamps the track tube 162 within the clamp assembly 1808 by turning a hand wheel 1810. Clamp plate screws or pins 1816 help to maintain the clamp plate 1814 in alignment. The clamp plate screws 1816 may be spring loaded.

Turning to FIGS. 48–50, the slide head 1820 includes a camera mounting for Mitchell plate 1822 attached to a head plate 1828 via posts 1824. The head plate 1828 is slidably attached to the track bearing rails 164 via rollers 1826. One or more slide brakes 1830 on the head plate 1828 are used to adjust the rolling friction of the slide head 1820 on the track tubes 164. A plate mounting stud 1834 on the head plate 1828 is secured to a tube plate 1838 via a nut 1836.

Referring once again to FIGS. 42–44, the track section accessory 1800 is installed onto a platform 28 or other support using a nut on the stud 1806. A camera, such as the camera 275, is mounted onto the plate 1822, via the well-known Mitchell mount design, or other techniques. The slide head 1820 carrying the camera can then slide along the track section 60, as described above. The slide head 1820 can pass through the track frame 1802, as shown in FIG. 42. Consequently, the track section 60 may be centered on the track frame 1802, or it may be offset to one side. For example, as shown in FIGS. 43 and 44, the track frame 1802 is at the extreme left end of the track section 60. This provides a maximum amount of travel distance from the platform 28 or other structure supporting the accessory 1800. The slide head 1820 may alternatively be inverted on the track section 60, as shown in dotted line in FIG. 43, to support the camera underneath the track section 60.

Consequently, via the use of the track frame 1802 and slide head 1820, the track section 60 provided on the crane 40 as shown in FIGS. 1–3B may also achieve several advantages provided by the crane 40, but in a more compact form, which is easier to store, transport, and use in more confined spaces.

As the crane 40 is a single piece, it can be quickly set up, without tools. As it provides for many different movements, separate leveling heads or other accessories are not needed. In addition, the camera operator has complete control of all needed camera movements. The crane, which is lightweight due to hollow beam construction, undercutting, and lightening holes, can therefor be operated by a single person.

Various equivalents may be used for the fasteners and attachments shown and described, including other types of fasteners, adhesives, welding, integral construction, etc. In addition, various equivalents may be used in place of the bearings and rollers shown and described, including bushings, low friction surfaces, lubricants, etc. Various of the components shown and described may also be combined into a single component, rather than being multiple components, as shown, or components shown and described as single components may be divided into two components or multiple components.

A novel remote camera platform control and positioning system and crane has been shown and described. Various changes and modifications may of course be made without departing from the spirit and scope of the invention. The invention, therefore, should not be limited, except by the following claims, and their equivalents.

What is claimed is:

1. A remote control system for controlling movement of a camera platform on a camera crane, comprising:
    a platform shaft attached to the camera platform and pivotably supported on a frame of the camera crane;
    a clutch associated with the platform shaft;
    a shaft gear attached to the shaft by the clutch;
    a drive accessory including a motor shaft driven by a motor, and a worm gear on the motor shaft, with the worm gear engaging the shaft gear, with the drive accessory attached to the frame at a pivot joint; and
    spring acting between the drive accessory and the frame, to keep the worm gear engaged into the shaft gear.

2. The remote control system of claim 1 where the clutch includes a R5 tensioning bolt and a tensioning spring, and at least one pressure plate on the platform shaft and contacting the shaft gear.

3. The remote control system of claim 1 where the shaft gear and the worm gear form a self-locking drive unit.

4. The remote control system of claim 1 where the drive accessory is attached to the frame with fasteners which allow the drive accessory to be attached to the frame to provide remote control functions and allow the drive accessory to be removed from the frame, for manual control functions.

5. The remote control system of claim 1 with the clutch further comprising a tensioning device for allowing the shaft gear to slip on the platform shaft if a predetermined level of torque on the shaft gear is exceeded.

6. The remote control system of claim 5 further comprising a tension limiter associated with the tensioning device for limiting the level of tension which the clutch can exert on the shaft gear.

7. The remote control system of claim 1 wherein at least one of the worm gear and the shaft gear comprise UHMW plastic.

8. The remote control system of claim 1 wherein the clutch limits the torque on the shaft gear to from about 20–60 in/lbs.

9. The remote control system of claim 1 wherein the motor speed ranges from 0–1000 rpm and is directly connected to the shaft gear via the platform shaft, with no intermediate gear reduction.

10. The remote control system of claim 1 where the drive accessory includes the motor, the worm gear, the clutch, the spring, and the shaft gear, with the shaft gear engaged onto an accessory shaft by the clutch, and with the accessory shaft attachable to the platform shaft.

11. The remote control system of claim 10 further comprising a handle on the platform shaft, for controlling movement of the platform by hand, with the handle removable and replaceable with the accessory shaft, for remote control of movement of the platform.

12. The remote control system of claim 1 further comprising a remote control unit linked to the motor, for remotely controlling the motor to move the camera platform.

13. The remoter control system of claim 12 where the remote control unit is linked to the motor via a cable.

14. A remote control accessory for use on a camera crane to move and position a camera platform supported on a frame of the camera crane, comprising:
   an accessory housing attachable to the frame of the camera crane;
   a shaft gear rotatably supported on the housing and connectable to the camera platform;
   a drive motor having a drive motor gear engageable with the shaft gear; and
   a spring on the housing acting to urge the drive motor gear into engagement with the shaft gear, when the accessory housing is attached to the frame of the camera crane.

15. The accessory of claim 14 further comprising a clutch positioned to limit torque applied between the camera platform and the drive gear.

16. The accessory of claim 15 where the clutch comprises a tensioning bolt, a clutch spring and at least one pressure plate against a side surface of the shaft gear.

17. The accessory of claim 14 further comprising a remote control box linked to the drive motor by a cable.

18. The accessory of claim 14 where the drive motor gear is a worm gear having a self locking thread pitch, so that with the accessory installed on the camera crane, the camera platform cannot be moved without turning on the motor, or slipping the clutch.

19. A remote control accessory for use on a camera crane to move and position a camera platform, comprising:
   a drive motor attachable to the camera crane and having
      a drive shaft connectable directly or indirectly to the camera platform;
   a controller linked to the drive motor, and including:
      a control stick pivotally attached to a shaft with the control stick having a first end in at least indirect contact with a first cam;
      a first converter linked to the first cam;
      a second cam in at least indirect contact with the shaft; and
      a second converter linked to the second cam.

20. The accessory of claim 19 where the first converter is a variable resistor.

21. The accessory of claim 19 with the second cam and the second converter attached to a second housing, and with the first cam and the first converter attached to a first housing, and with the first housing pivotable relative to the second housing.

22. The accessory of claim 21 where the second housing is attached to the controller.

23. The accessory of claim 19 further comprising a pair of return actuators attached at opposite ends of the first cam.

24. The accessory of claim 21 further including a converter clamp on the first converter and a pair of opposing adjustment screws supported at least directly on the first housing and engageable to the clamp.

\* \* \* \* \*